United States Patent
Kellner

(10) Patent No.: US 11,860,302 B2
(45) Date of Patent: Jan. 2, 2024

(54) APPARATUS AND METHOD FOR CHARACTERIZING AN OBJECT BASED ON MEASUREMENT SAMPLES FROM ONE OR MORE LOCATION SENSORS

(71) Applicant: Bayerische Motoren Werke Aktiengesellschaft, Munich (DE)

(72) Inventor: Dominik Kellner, Dachau (DE)

(73) Assignee: Bayerische Motorenwerke Aktiengesellschaft, Munich (DE)

( * ) Notice: Subject to any disclaimer, the term of this patent is extended or adjusted under 35 U.S.C. 154(b) by 416 days.

(21) Appl. No.: 17/309,227

(22) PCT Filed: Oct. 7, 2019

(86) PCT No.: PCT/EP2019/077003
§ 371 (c)(1),
(2) Date: May 10, 2021

(87) PCT Pub. No.: WO2020/099024
PCT Pub. Date: May 22, 2020

(65) Prior Publication Data
US 2021/0390331 A1 Dec. 16, 2021

(30) Foreign Application Priority Data
Nov. 16, 2018 (EP) .................. 18206813

(51) Int. Cl.
*G06K 9/00* (2022.01)
*G01S 7/41* (2006.01)
(Continued)

(52) U.S. Cl.
CPC .............. *G01S 7/411* (2013.01); *G06V 20/58* (2022.01); *G01S 13/931* (2013.01); *G01S 2013/9323* (2020.01); *G01S 2013/9324* (2020.01)

(58) Field of Classification Search
CPC ...................................... G06V 20/58
See application file for complete search history.

(56) References Cited

U.S. PATENT DOCUMENTS

| 7,142,984 B2 * | 11/2006 | Rahmes | G06V 10/30 |
| | | | 702/5 |
| 2015/0003683 A1 * | 1/2015 | Grewe | G06V 20/56 |
| | | | 382/104 |

(Continued)

FOREIGN PATENT DOCUMENTS

| CN | 108319655 A | 7/2018 |
| EP | 3454084 A1 * | 3/2019 |

OTHER PUBLICATIONS

Visual Recognition Using Local Quantized Patterns, Sibt ul Hussain et al., Springer, 2012, pp. 716-729 (Year: 2012).*

(Continued)

*Primary Examiner* — Jayesh A Patel
(74) *Attorney, Agent, or Firm* — 2SPL Patentanwälte PartG mbB; Kieran O'Leary

(57) ABSTRACT

A concept of characterizing an object based on measurement samples from one or more location sensors, the measurement samples having a first spatial resolution. The measurement samples are quantized to a grid map of weighted cells having a second spatial resolution lower than the first spatial resolution, wherein a measurement sample contributes to a weight coefficient of one or more weighted cells depending on a measurement accuracy. Parameters of one or more lines fitting the weighted cells are computed to obtain a characterization of the object.

15 Claims, 14 Drawing Sheets

(51) Int. Cl.
*G06V 20/58* (2022.01)
*G01S 13/931* (2020.01)

(56) References Cited

U.S. PATENT DOCUMENTS

| | | | | |
|---|---|---|---|---|
| 2017/0352163 | A1* | 12/2017 | Mottin | G05D 1/00 |
| 2018/0103259 | A1* | 4/2018 | Mann | H04N 21/85406 |
| 2018/0189574 | A1* | 7/2018 | Brueckner | H04N 19/10 |
| 2018/0203447 | A1* | 7/2018 | Wyffels | B60W 30/09 |
| 2018/0231650 | A1* | 8/2018 | Heitzmann | G01S 13/86 |

OTHER PUBLICATIONS

Color and Texture Descriptors, B. S. Manjunath et al., IEEE, 2001, pp. 703-715 (Year: 2001).*
Scene Classification Using a Hybrid Generative/Discriminative Approach, Anna Bosch et al., IEEE, 2008, pp. 712-727 (Year: 2008).*

* cited by examiner

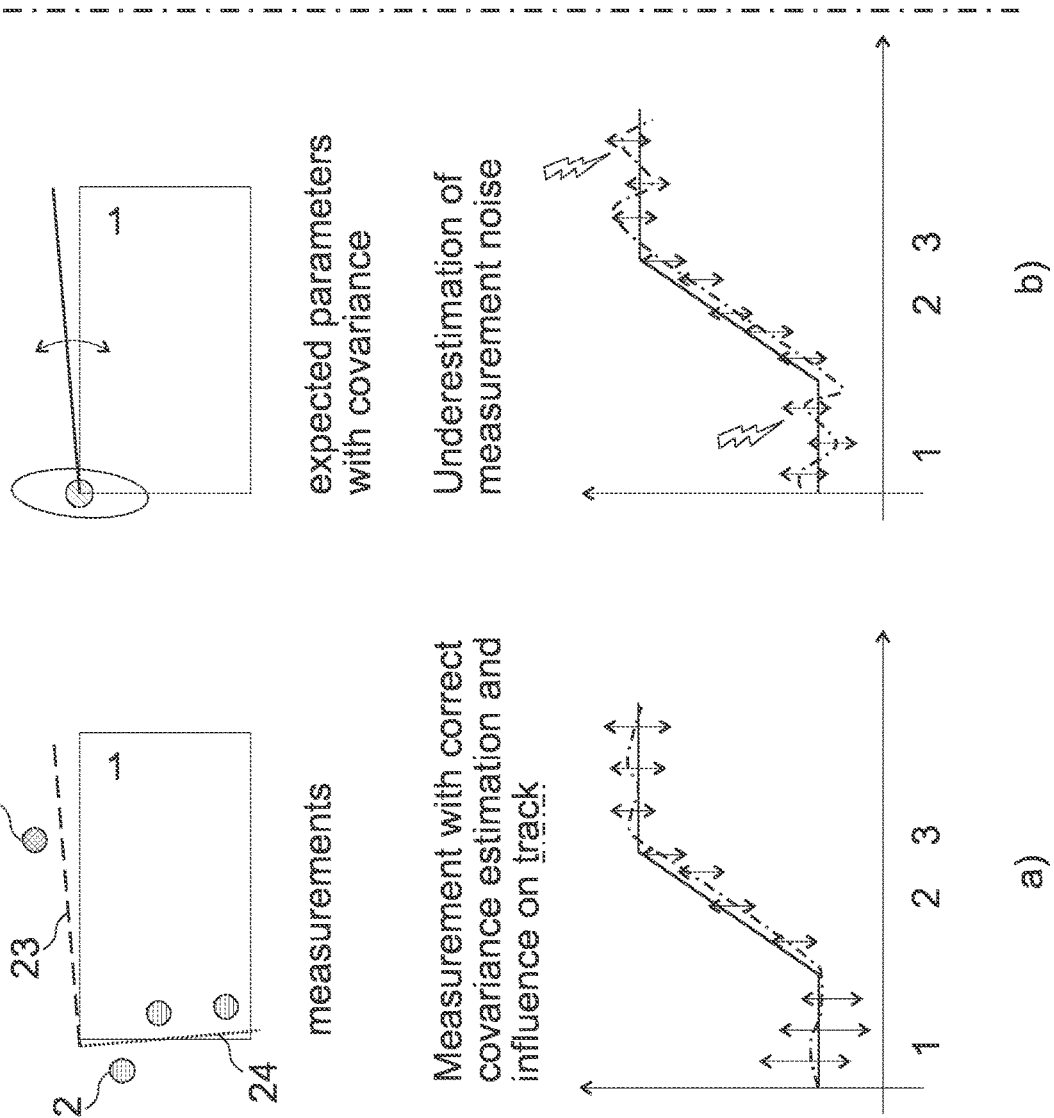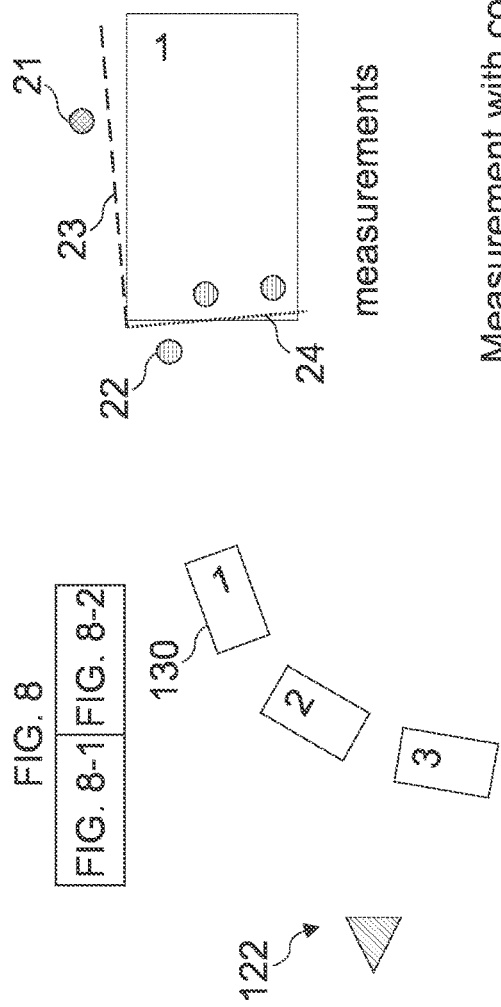

APPARATUS AND METHOD FOR CHARACTERIZING AN OBJECT BASED ON MEASUREMENT SAMPLES FROM ONE OR MORE LOCATION SENSORS

CROSS-REFERENCE TO RELATED APPLICATIONS

This application is a 35 U.S.C. § 371(c) national stage entry of PCT/EP2019/077003, filed on Oct. 7, 2019. That application claimed priority to European Application 18206813.0 filed on Jan. 23, 2019. The contents of the earlier filed applications are incorporated by reference herein in their entirety.

FIELD

The present disclosure relates to concepts for sensing surrounding objects and more particularly to apparatuses, methods and computer programs for detecting and characterizing edges of one or more objects, which can be useful in the field of autonomous driving, for example.

BACKGROUND

Since a development of autonomous driving and driving assistant systems, there is a demand of locating and tracking surrounding objects reliably and precisely. In order to make such systems work safely and, for example, to prevent a car, equipped with one of these systems, from crashing with surrounding objects, the accuracy of the object characterization is essential. In case of autonomous driving or driving assistant systems such surrounding objects can be traffic participants like cars, trucks, motorcyclists or pedestrians, for example.

For the functionality of such systems it may be necessary to determine the object's spatial parameters (e.g. position, distance, orientation, shape) and parameters of motion (e.g. velocity, rotation). Various types of location sensors can be used to gather information from the surrounding. In some applications laser scanners are used to scan the environment and to generate measurement data including spatial coordinates of measurement points on edges of one or more objects from reflections of a laser beam at these edges. Known methods use algorithms to assign clusters of measured coordinates to one or more respective objects. So-called box fitting algorithms determine a best fitting rectangular box or parts thereof representing the edges of an object taking into account its measured spatial coordinates. Since location sensors typically detect one or more edges of an object, one or more orthogonal lines of a rectangular box can be fitted to the edges. The object's parameters can be derived from the parameters of the one or more fitted lines (line parameters). From a single measurement scan it is possible to determine a shape and an orientation of the one or more fitted lines while also tracking overtime is possible from multiple consecutive measurement scans to determine an object's velocity and rotation. Thus an object can be characterized by such calculated parameters approximating a shape, a position, an orientation, a rotation and a velocity of the object.

For a reliable characterization of small or distant objects location sensors with a high spatial measurement resolution can provide accurate results. Common applications use laser scanners as location sensors. However it is also possible to use other location sensors like high resolution radar, cameras or ultra sonic sensors. In order to achieve an increased spatial measurement resolution it is also conceivable to apply multiple location sensors or even a combination of them. A consequence of an increased spatial resolution is an increased amount of measurement samples. Thus a processing time of conventional line fitting methods increases, while for a precise tracking of the line parameters over time it is important to provide a high rate of calculated line parameters. This is not possible if the processing time of a line fitting method is too large.

Hence there is a demand of lowering the processing time, while at the same time keeping the spatial accuracy of the estimated line parameters as high as possible.

SUMMARY

This demand is met by apparatuses, vehicles, methods and computer programs in accordance with the independent claims. Further embodiments which may be beneficial under specific circumstances are addressed by the dependent claims.

According to a first aspect, the present disclosure provides a method for characterizing an object based on measurement samples from one or more location sensors. The measurement samples have a first spatial resolution. Further the method comprises a quantization of measurement samples to a grid map of weighted cells. The grid map has a second spatial resolution lower than the first spatial resolution. Each measurement sample contributes to a weight coefficient of one or more weighted cells depending on a measurement accuracy. The method also comprises a computation of line parameters of one or more lines fitting the weighted cells to obtain a characterization of the object.

The measurement samples can be digital samples directly or indirectly produced by distance or location sensors, such as one or more LIDAR (light detection and ranging) sensors, one or more Radar (radio detection and ranging) sensors, or one or more ultrasonic sensors, just to name a few examples. The skilled person having benefit from the present disclosure will appreciate that different distance detection technologies can also be combined. In some example implementations, the measurement samples can be indicative of coordinates of points of one or more objects from which distance measurement signals, such as light, radio, or ultrasonic signals, have been reflected. As mentioned above, in case of automotive applications, such objects can be traffic participants like cars, trucks, motorcyclists or pedestrians, for example. Some applications aim at detecting edges of such objects.

Depending on the measurement accuracy of the one or more location sensors, the measurement samples or the coordinates have a certain spatial resolution. In general, there is a tendency to higher and higher resolutions. A downside of the latter is that computational efforts increase, such as, for example, a computational complexity of fitting one or more lines, for example corresponding to one or more object edges, to the measurement samples. For that reason the present disclosure proposes to reduce the computational complexity of the line fitting by mapping measurement samples of higher spatial resolution to cells of a grid map with lower spatial resolution. While the first spatial resolution of the measurement samples in x- and y-direction can be, for example, 5000×5000 pixels, the second spatial resolution of the grid map can be, for example, 125×125 cells. Additional information is provided by the respective cell weights. More than one measurement sample can fall within a cell and/or contribute to a cell weight.

One or more lines are then fitted to the weighted cells or the coordinates thereof. The lines can correspond to one or more edges of an object. The line fitting can be done by setting up a system of linear equations and solving for the respective line parameters. The line parameters can be indicative of the respective line's slope and its position. The system of linear equations can include a vector including the deviations/distances of the weighted cells from the one or more lines, a system matrix including the coordinates corresponding to the weighted cells, and a vector including the line parameters.

In some example implementations, the method can include determining the weight coefficient of a weighted cell based on a probability distribution around the measurement sample, wherein the probability distribution is based on the measurement accuracy of the one or more location sensors. The probability distribution can be a Gaussian distribution or a Laplace distribution, for example, depending on the characteristics of the one or more location sensors. The skilled person having benefit from the present disclosure will appreciate that locations sensors will provide their measurements with certain measurement inaccuracies, which can be modeled by such probability distributions. A measurement appearing at coordinates (x, y) can thus have an uncertainty of (x±Δx, y±Δy), where (x, y) then marks the positional peak of the probability distribution. The positional peak will be located within a cell of the grid map, thereby contributing to its weight coefficient. Portions of the probability distribution around the peak may reach into one or more neighboring cells, thereby also contributing to their respective weight coefficients. Thus, a single measurement sample can contribute to the weight coefficients of more than one cell. In other words, a measurement sample having an associated non-vanishing probability distribution in an area of a weighted cell adds to the weight coefficient of said cell.

In some examples, the lines can be interpreted as reflecting edges of the one or more objects. Therefore the lines can be indicative of a position and/or orientation of a remote object relative to the one or more location sensors. In case of vehicles the lines can circumscribe a vehicle or a part thereof "seen" by the sensors. In case only two edges are "visible" the measurement samples and hence the lines may have an L-shape, for example. The method may thus include detecting, based on the weighted cells one or more edges of the object, the one or more edges corresponding to the one or more lines.

In some example implementations orthogonality between two lines can be assumed. Thus the method can include computing line parameters of two orthogonal lines fitting the weighted cells. This can reduce the computational complexity of the linear equation system since the slope of both lines can be expressed by the same line parameters (with different signs and swapped vector elements though). The assumption of orthogonality between two lines is feasible in the case of vehicles, for example, which have roughly box-like external contours.

In some example implementations, the line parameters of the one or more lines can be computed based on a least squares fit. For example, a (constraint) least square algorithm can be used for that. In constrained least squares one solves a linear least squares problem with an additional constraint on the solution. I.e., the unconstrained equation Wr=W Ap must be fit as closely as possible (in the least squares sense), while ensuring that some other property of p is maintained. The constraint can be that the lines are orthogonal. In the above equation r denotes the vector of deviations (minimized in least square sense) of the center of weighted cells from the one or more lines, A denotes a system matrix, and p denotes the vector of line parameters. The system matrix A can include the coordinates of the centers of the respective cells, for example. Here, the system matrix A is multiplied with the corresponding matrix of weights W to consider the quantization of the measurement samples into the cells of the grid map.

In some example implementations the method provides computing a first and a second line parameter corresponding to an orientation of the one or more lines. The calculation of line parameters can be based on a computation of an eigenvector of a normalized system matrix. The normalized system matrix comprises normalized coordinates of the weighted cells, the normalized coordinates being normalized to weighted mean coordinates of the one or more lines.

Since for some implementations of the present method it may be feasible to assume orthogonality of two lines, the orientation of both lines can be expressed by two parameters (with different signs and swapped vector elements though). Those comprise the first line parameter $n_1$ and the second line parameter $n_2$. A third and fourth line parameter, representing the position of the lines are independent from the first and the second line parameter and can be computed from those and the weighted system matrix WA. Hence for determining the first and the second line parameter the normalized system matrix can be used. The normalized system matrix represents a grid map of cells shifted to the grid map of weighted cells of the system matrix A. The cells of the lines are relocated so that the weighted average of the cell coordinates of one of the one or more lines is equivalent to the coordinate origin. The weights used for averaging correspond to the weight coefficients of the respective cells. The normalization can be done by subtracting the calculated mean values of the coordinates from the coordinates of the weighted system matrix according to:

$$A_{norm} = A - I \begin{bmatrix} \tilde{x}_1 & \tilde{y}_1 \\ \tilde{x}_2 & \tilde{y}_2 \end{bmatrix}$$

$$\text{wherein} = \begin{bmatrix} 1 & 0 \\ \vdots & \vdots \\ 1 & 0 \\ 0 & 1 \\ \vdots & \vdots \\ 0 & 1 \end{bmatrix}, \tilde{x}_j = \sum_i w_{j,i} x_{j,i} \text{ and } \tilde{y}_j = \sum_i w_{j,i} y_{j,i}$$

Note that this example provides two orthogonal lines. However this is also possible for one or more lines.

The first and the second line parameter then can be estimated by determining the eigenvector corresponding to the lower eigenvalue of the squared weighted normalized system matrix according to:
$[n_1 \ n_2]^T$=eigenvector of $(A_{norm}{}^T W A_{norm})$
wherein $A_{norm}$ denotes the normalized system matrix.

In some example implementations the method provides computing at least one further line parameter $c_1$ corresponding to a position of line j based on $$c_j = \frac{W_j A_j}{\sum w_{j,i}} [n_1 \ n_2]^T,$$

wherein $n_1$ and $n_2$ correspond to the first and a second line parameter and $A_1$ is the corresponding part of the system matrix A, including the measurement samples of line. For an example of two-dimensional measurement samples and a L-shape fitting of two orthogonal lines there are two further parameters, $c_1$ and $c_2$. These parameters can be interpreted as parameters defining the position of the fitted lines. Basically $$-\frac{c_1}{n_2} \text{ and } \frac{c_2}{n_1}$$

define the y-axis intercept of the both lines.

In some example implementations, the method provides computing a system covariance matrix including variances of the respective line parameters and covariances between different line parameters based on a system matrix including coordinates of the weighted cells, the weight coefficients of the weighted cells, and based on deviations of the weighted cells from the one or more lines. The system covariance matrix can be regarded as a measure of reliability of the measurements and can be used as a baseline for further computations, such as adjusting tracking or discrete time filters, for example. The tracking of objects can thus be improved.

In some example implementations, in particular related to L-shape fitting, the system covariance matrix can be computed according to $$\sum\nolimits_{Sys} = \frac{rWr^T}{2\sum_{j,i} w_{j,i}} (A^T W A)^{-1}$$

$\Sigma_{j,i} w_{j,i}$ denotes a sum of weights of the i-th measurement sample of line j. In case two orthogonal lines are defined by four line parameters, a dimension of $\Sigma_{Sys}$ would be 4×4. The skilled person having benefit from the present disclosure will appreciate that the dimension of $\Sigma_{sys}$ will be dependent on the number of lines and thus the number of line parameters needed for defining the lines. The system covariance matrix $\Sigma_{Sys}$ can be used to derive further quantities of interest for tracking or prediction of the one or more objects.

For example, a covariance matrix of coordinates $(x_c, y_c)$ of an intersection point between a first and a second line can be computed based on the system covariance matrix and the coordinates $(x_c, y_c)$. The covariance matrix of the coordinates $(x_c, y_c)$ of the intersection point can be computed according to $\Sigma_c = [p_1, p_2]^T \Sigma_{sys} [p_1, p_2]$, wherein $p_1$ and $p_2$ denote vectors corresponding to the coordinates of the intersection point of two lines according to $p_1 = [x_i, y_i, 1, 0]^T$ and $p_2 = [-y_i, x_i, 0, 1]^T$ The skilled person having benefit from the present disclosure will appreciate that here the coordinates of an intersection point of two lines are expressed in a form that solves the linear equation of the lines according to:
$0 = n_1 x_c + n_2 y_c + 1 \cdot c_1 = p^T \cdot p_1$ for a first line
or $0 = n_2 x_c - n_1 y_c + 1 \cdot c_2 = p^T \cdot p_2$ for a second line, orthogonal to the first line
for vector of line parameters according to: $p = [n_1, n_2, c_1, c_2]T$ $n_1$ and $n_2$ denote the slope of the fitted lines, while $c_1$ respectively $c_2$ denote a vertical position of each fitted line.

Other mathematical expressions are however also possible. The covariance matrix of the coordinates of the intersection point has a dimension of 2×2 and can be used to estimate an accuracy of the fitting process of the two orthogonal lines to the respective measured coordinates. Basically a covariance of line parameters denotes a joint variability of two vector elements of the vector of deviations. If the greater values of one vector element tend to correspond with greater values of another element and vice versa, the covariance is positive. If greater values of one vector element tend to correspond with smaller values of another element, and vice versa, the covariance is negative. For some example, the covariance can be calculated from a vector r=Ap representing the deviations of the fitted lines from the measurement samples. Here covariance can be used to estimate an uncertainty of a first line parameter taking into account an uncertainty of a second line parameter. Further a small absolute value of a covariance denotes a weak correlation and a large absolute value a strong correlation.

Additionally or alternatively, a variance of an estimated orientation can be computed based on a combination of line parameters corresponding to an orientation of the fitted lines, variances of said line parameters, and covariances of said line parameters obtained from the system covariance matrix. For example, the variance of the orientation can be computed according to $$\sigma_\Phi^2 = \frac{\sigma_{n1}^2 n_2^2 + \sigma_{n2}^2 n_1^2 + 2\text{cov}(n_1, n_2) n_1 n_2}{n_1^2 + n_2^2},$$

wherein $n_1$ and $n_2$ are line parameters, $\sigma_{n1}^2$, $\sigma_{n2}^2$ are variances of the respective line parameters and $\text{cov}(n_1, n_2)$ is the covariance of the respective line parameters. If $\sigma_\Phi^2$ is relatively low, then a current estimate of the object's orientation appears relatively trustworthy. If $\sigma_\Phi^2$ is relatively high on the other hand, then a current estimate of the object's orientation appears relatively weak. This information can be used for tracking objects by means of discrete time filters, such as Kalman or particle filters, for example.

Thus, in some example implementations the method can further include adjusting a discrete time filter for estimating a current state (e.g. position, velocity, acceleration) of the object based on previous measurements directly or indirectly based on the computed system covariance matrix.

According to a further aspect, the present disclosure provides an apparatus for characterizing an object based on measurement samples from one or more location sensors. The measurement samples of the location sensors have a first spatial resolution. The apparatus further comprises a quantization of the measurement samples to a grid map of weighted cells having a second spatial resolution lower than the first spatial resolution. Every measurement sample contributes to a weight coefficient of one or more weighted cells depending on a measurement accuracy. Fitting the weighted cells the apparatus provides computing parameters of one or more lines to obtain a characterization of the object.

The skilled person having benefit from the present disclosure will appreciate that the methods and/or apparatuses can be implemented by using a computer program having a corresponding program code for carrying out the method when the computer program is run on a programmable hardware device, such as a digital signal processor (DSP) or a field programmable gate array (FPGA), for example.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
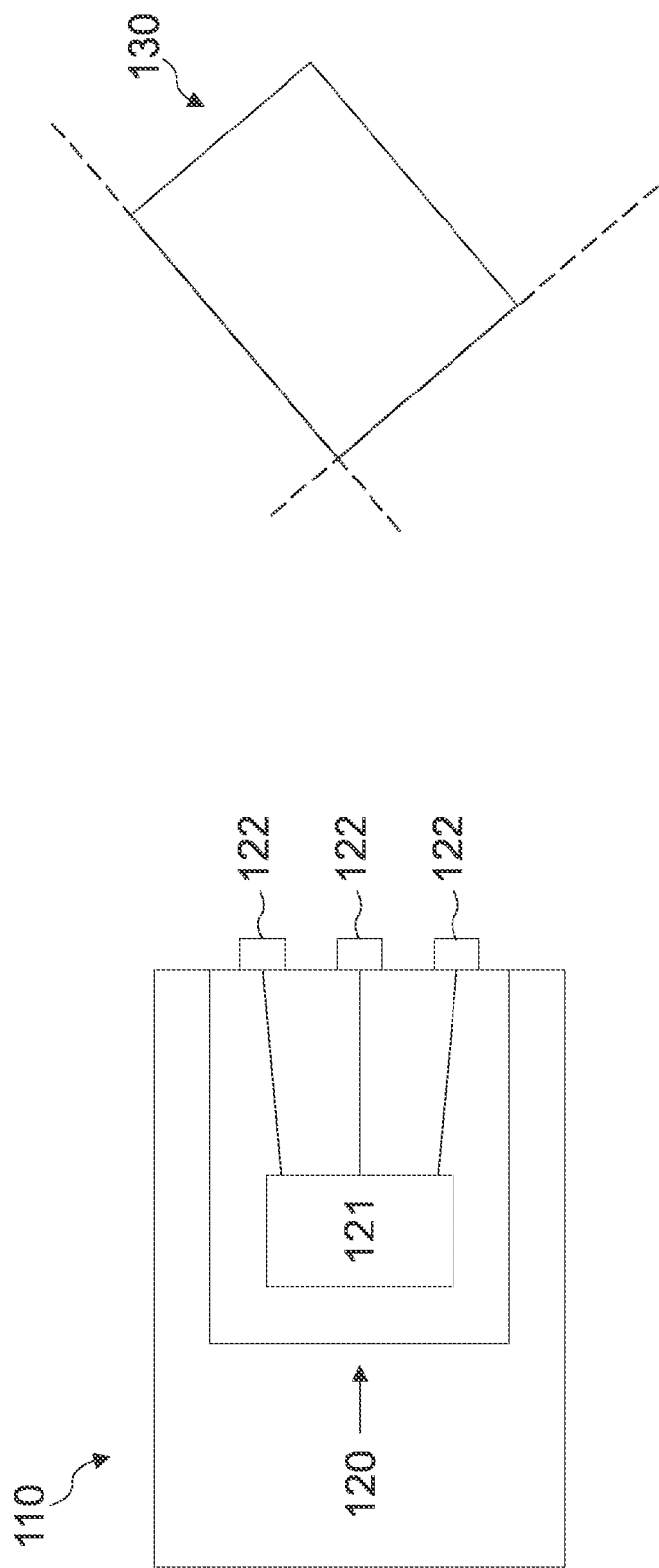
FIG. 1 illustrates an example implementation of an automotive application comprising one or more location sensors and an apparatus for characterizing objects from measurement samples of those sensors.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Safety may be regarded as an important aspect of driving assistant and autonomous driving systems. To ensure reliability of such concepts and to pretend, for example, autonomously driving cars from crashing with surrounding objects, the surrounding objects may be characterized by position, distance, orientation, velocity, acceleration, rotation, or a combination thereof. In case of automotive applications, the surrounding objects typically can be pedestrians, cars, motorcycles or trucks. For characterizing those objects, commonly location/distance sensors like LIDAR systems, Radar systems, cameras or ultra sonic sensors can be used. Measurement samples coming from such location sensors can be used to characterize an object, for example, regarding its shape, position, orientation, velocity and/or acceleration. To get a higher accuracy, a single measurement (e.g. of the object's position or orientation) may be filtered over time to get a higher accuracy and to estimate derivations of the states (e.g. velocity out of position displacement over time). Conventional filtering techniques include Kalman Filters or Particle Filters.

In autonomous driving, a common source of information can be laser scanners, which can provide detailed information about the shape of the object (contour). In case of traffic participants, objects can be represented by a box. There are conventional methods extracting these boxes with its parameters (e.g. position of box, orientation).

To incorporate the measurement information (box parameters) it is helpful to model its accuracy (usually expressed by a variance in 1D, otherwise by a covariance matrix). Conventional require a covariance matrix, describing the variance of the different measured line parameters and their covariance (correlation). The system covariance matrix is helpful to get not only a precise estimation of the object's state, but as well represents the accuracy of the estimated states and the correlation of the state(s). Decisions of following (downstream) processing modules are usually based on the accuracy of the states. Conventional approaches usually use heuristics or look-up-tables for the covariance matrix and ignore covariance between different parameters.

While embodiments of the present disclosure will be described with regard to automotive applications, the skilled person having benefit from the present disclosure will appreciate that the presented concepts can be used in other scenarios as well, such as for airplanes or for boats, for example.

FIG. 1 schematically shows a vehicle 110 in accordance with embodiments of the present disclosure. The vehicle includes an apparatus 120 comprising one or more location/distance sensors 122 and a processing circuit 121.

The location/distance sensors 122 can be LIDAR, Radar, or ultrasonic sensors, or a combination thereof, transmitting signals and receiving the signals reflected from a remote object 130. The location/distance sensors 122 are coupled to the processing circuit 121 in order to transfer measurement data. Measurement data can be, for example, indicative of coordinates of reflection points of the object's surface. The processing circuit 121 is configured to compute, based on the measurement samples, line parameters of one or more lines fitting the coordinates of the measurement points to obtain a characterization of the object 130, for example with regard to its position/distance, orientation, velocity, acceleration or rotation.

Figure 2:
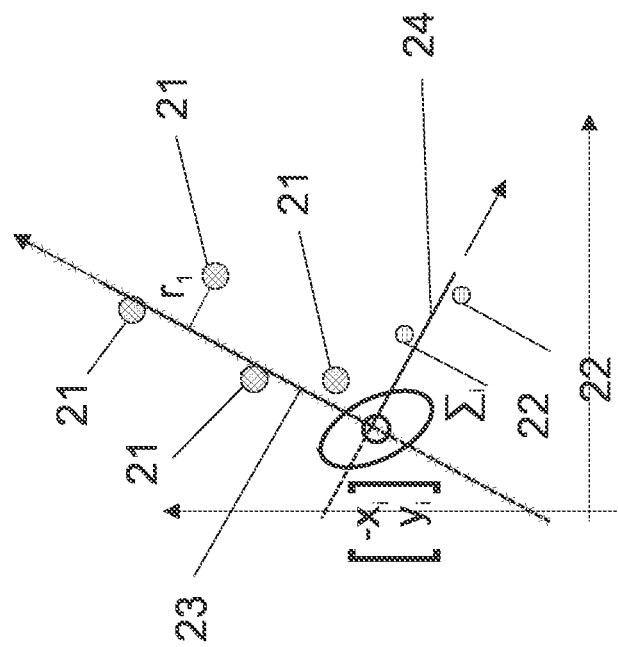
FIG. 2 illustrates a process of fitting lines to two-dimensional measurement samples.
Figure 2:
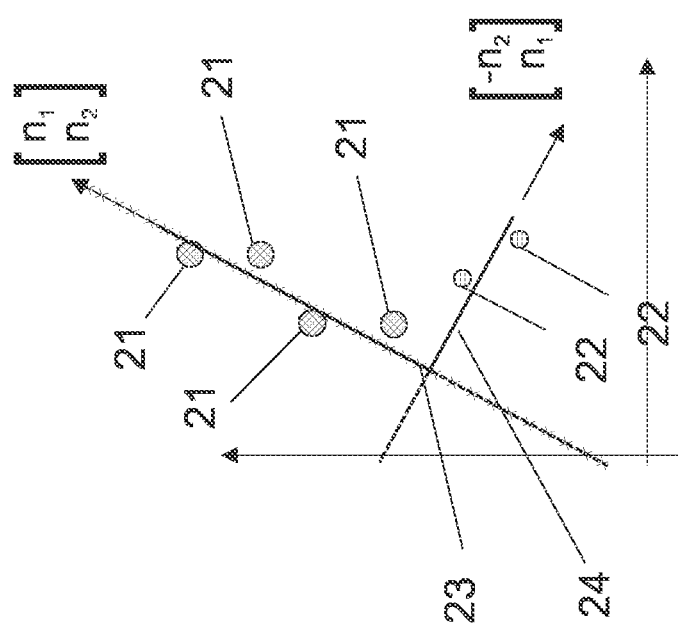

An example of fitting boxes or lines to coordinates of measurement points 21, 22 is illustrated in FIG. 2. The measurement points 21, 22 may be assigned to one or more edges of the object depending on their positional arrangement. In the example of FIG. 2 the measurement points 21, 22 are assigned to two edges of object 130, thereby assuming that the object 130 can be sufficiently characterized by the two edges. The edges may be modeled by respective lines 23 and 24. Thus, a line fitting process may fit the two lines 23, 24 to the coordinates of the measurement points 21, 22. In some examples, the lines 23, 24 can be assumed to be orthogonal to each other. In this case the respective orientation of the two lines 23, 24 can be defined by the same line parameters. The skilled person having benefit of the present disclosure will appreciate that the line fitting is also possible for one or more than two lines and for "non-orthogonal" lines. Further examples of line fitting processes are "I-shape-fitting" for one line, "U-shape-fitting" for three lines of a rectangle or fitting of a complete rectangle.

In some example implementations, the line parameters of the lines 23, 24 can be computed based on a least squares fit. For example, a (constraint) least square algorithm can be used for that. In constrained least squares one solves a linear least squares problem with an additional constraint on the solution. I.e., the unconstrained equation $$r = Ap \qquad (1)$$

has to be fit as closely as possible (in the least squares sense) while ensuring that some other property of p is maintained. The linear equation system (1) is based on a system matrix A including the coordinates of the measurement points 21, 22. In the illustrated example the coordinates are Cartesian coordinates in the form (x, y). The vector r denotes deviations (distances) of the measurement points 21, 22 from the (fitted) lines 23 and 24. The line parameters defining the lines 23, 24 are included in vector p. For the example of two orthogonal lines 23, 24 the line parameters can be expressed as: $p = [n_1, n_2, c_1, c_2]T$. The two line parameters $n_1$, $n_2$ define the slope/orientation of the (orthogonal) lines 23, 24. A third line parameter $c_1$ and a fourth line parameter $c_2$ correspond to a position of the lines 23, 24. The slope or orientation is determined by $$\begin{bmatrix} n_1 \\ n_2 \end{bmatrix}$$

for the first line 23 and by $$\begin{bmatrix} n_2 \\ -n_1 \end{bmatrix}$$

for the second line 24. The y-intercepts of the lines can be defined according to:

$$y(x = 0) = -\frac{c_1}{n_2}$$

(for line 23) and $$y(x = 0) = \frac{c_2}{n_1}$$

(for line 24).

For the present example with two orthogonal lines 23, 24, the system matrix A can be represented according to:

$$A = \begin{bmatrix} x_{j=0,i=1} & y_{j=0,i=1} & 1 & 0 \\ \vdots & \vdots & \vdots & \vdots \\ x_{j=0,i=N} & y_{j=0,i=N} & 1 & 0 \\ -y_{j=1,i=1} & x_{j=1,i=M} & 0 & 1 \\ \vdots & \vdots & \vdots & \vdots \\ -y_{j=1i=M} & x_{j=1,i=M} & 0 & 1 \end{bmatrix}$$

wherein $x_{j,i} \in \{x_{j=0,i=1}, \ldots, x_{j=0,i=N}\}$ and $y_{j,i} \in \{y_{j=0,i=1}, \ldots, y_{j=0,i=N}\}$ denote the i-th of N measurement coordinates assigned to a first line j=0 and $x_{j,i} \in \{x_{j=1,i=1}, \ldots, x_{j=1,i=M}\}$ and $y_{j,i} \in \{y_{j=1,i=1}, \ldots, y_{j=1,i=M}\}$ denote the i-th of M coordinates of measurement points of a second line j=1. Hence a system of linear equation can be set up according to:

$$r_i = n_1 x_{j,i} + n_2 y_{j,i} + c_1 \text{ (for the first line 23)}$$

$$\text{or } r_i = n_2 x_{j,i} - n_1 y_{j,i} + c_2 \text{ (for the second orthogonal line 24),}$$

wherein $r_i$ is the distance of the i-th measurement point from the respective line 23, 24 defined by line parameters $n_1$, $n_2$, $c_1$ and $c_2$.

The determination of the line parameters $p = [n_1, n_2, c_1, c_2]T$ is known and provides lines 23, 24 approaching the object's 130 external contours. For example, an intersection point $(x_i, y_i)$ between lines 23 and 24 can be used as a reference point for the object's position.

To get a higher accuracy, a single measurement of the lines 23, 24 or another quantity derived thereof may be filtered over time to get a higher accuracy. Conventional filtering techniques include Kalman Filters or Particle Filters. The principle of such filters is to estimate a state of an object based on adequately weighting previous and current measurements in order to achieve an optimal estimation of an object's state. The object's state may be any state of interest, such as its position, distance, orientation, velocity, acceleration, rotation, etc.

Figure 3:
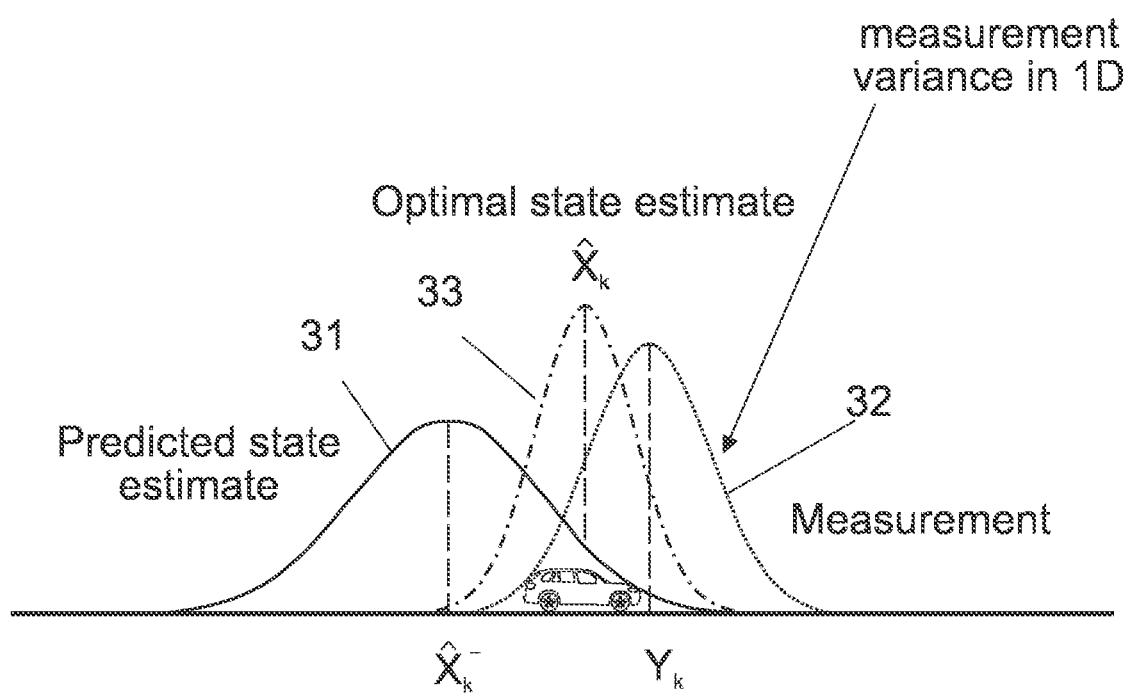
FIG. 3 illustrates the principle of a tracking filter in one dimension.

FIG. 3 illustrates an operation principle of a Kalman filter for the example of tracking an object's 130 state $x_k$ (e.g. position, orientation, etc.).

Kalman filtering, also known as linear quadratic estimation (LQE), is an algorithm that uses a series of measurements $y_k$ observed over timeframes k, containing statistical noise 32 (and other inaccuracies), and produces estimates $\widehat{x_k}$ of unknown variables that tend to be more accurate than those based on a single measurement alone, by estimating a joint probability distribution over the variables for each timeframe. The algorithm works in a two-phase process. In the prediction phase, the Kalman filter produces estimates $\widehat{x_k}$ of the current state variables, along with their uncertainties 33. Once the outcome of the next measurement $y_k$ (necessarily corrupted with some amount of error, including random noise) is observed, these estimates are updated ($\widehat{x_k}^- \rightarrow \widehat{x_k}$) using a weighted average, with more weight being given to estimates with higher certainty. The algorithm is recursive. It can run in real time, using the present input measurements $y_k$ and the previously calculated state $\widehat{x_k}^-$ and its uncertainty 31; no additional past information is required.

The estimate $\widehat{x_k}$ of the current state can be computed according to:

$$\widehat{x_k} = \widehat{x_k}^- + K_k(y_k - C\widehat{x_k}^-) \qquad (2)$$

wherein $$K_k = \frac{P_k^- C^T}{CP_k^- C^T + R}, \qquad (3)$$

denotes a weight coefficient calculated from a variance or covariance $P_k^-$ (reference numeral 31) of the object's previously estimated state $\widehat{x_k}^-$ a measurement variance or covariance R (reference numeral 32) and a measurement coefficient C. The measurement coefficient C expresses a relation of the measurement sample $\widehat{z_k}$ and a true state of the tracked state $\widehat{x_k}$ according to:

$$\widehat{z_k} = C\widehat{x_k}$$

For the present example the object's 130 position can directly be measured (e.g., intersection point $(x_i, y_i)$). Thus C is according to: C=1.

The above calculation of $K_k$ includes both an uncertainty $P_k^-$ of the previously calculated state $\widehat{x_k}^-$ and an uncertainty R of the current measurement $y_k$. The coefficient $K_k$ represents a contribution of the current measurement $y_k$ and the previously calculated state $\widehat{x_k}^-$ to the estimate $\widehat{x_k}$ of the current state. A relatively large value of $K_k$ can indicate a relatively low uncertainty (high certainty) of the current measurement $y_k$ compared to the uncertainty of the previously calculated state $\widehat{x_k}^-$. In such a case the estimate $\widehat{x_k}$ of the current state is predominantly determined by the current measurement $y_k$. For a small value of $K_k$, the estimate $\widehat{x_k}$ of the current state is predominantly determined by the previously calculated state $\widehat{x_k}^-$.

Conventional methods of adjusting the uncertainties $P_k^-$ and/or R use look-up-tables or heuristics, which often include predefined uncertainties. The predefined uncertainties can be selected based on a measurement accuracy of the sensors 122 and/or distance between the sensors 122 and the object 130, for example. Methods using such predefined uncertainties do not ensure a reliable adaption of the filters to the actual uncertainties of the line fitting process (yielding the current measurements $y_k$). This may be the case if an uncertainty of the line fitting process changes rapidly, for example due to a partly obstructed line of sight towards the object 130 or changing weather conditions.

It is one finding of the present disclosure that a tracking filter can operate more accurately when the adaptation of weight coefficient $K_k$. gets based on an online computation of the uncertainty R of current measurements $y_k$ instead on relying on predefined values. Here, the term "online" means that the uncertainty is determined along with determining the current measurements, e.g. along with determining the current measurement of lines 23, 24 defined by line parameters $p = [n_1, n_2, c_1, c_2]^T$, the position $(x_i, y_i)$, and/or the orientation. The present disclosure provides a method for estimating such uncertainties, expressed by covariances and variances of the fitted lines, simultaneously with respect to the measurement samples and the line parameters. Depending on the dimension of the measurements, the covariances can be scalars or matrices.

Figure 4:
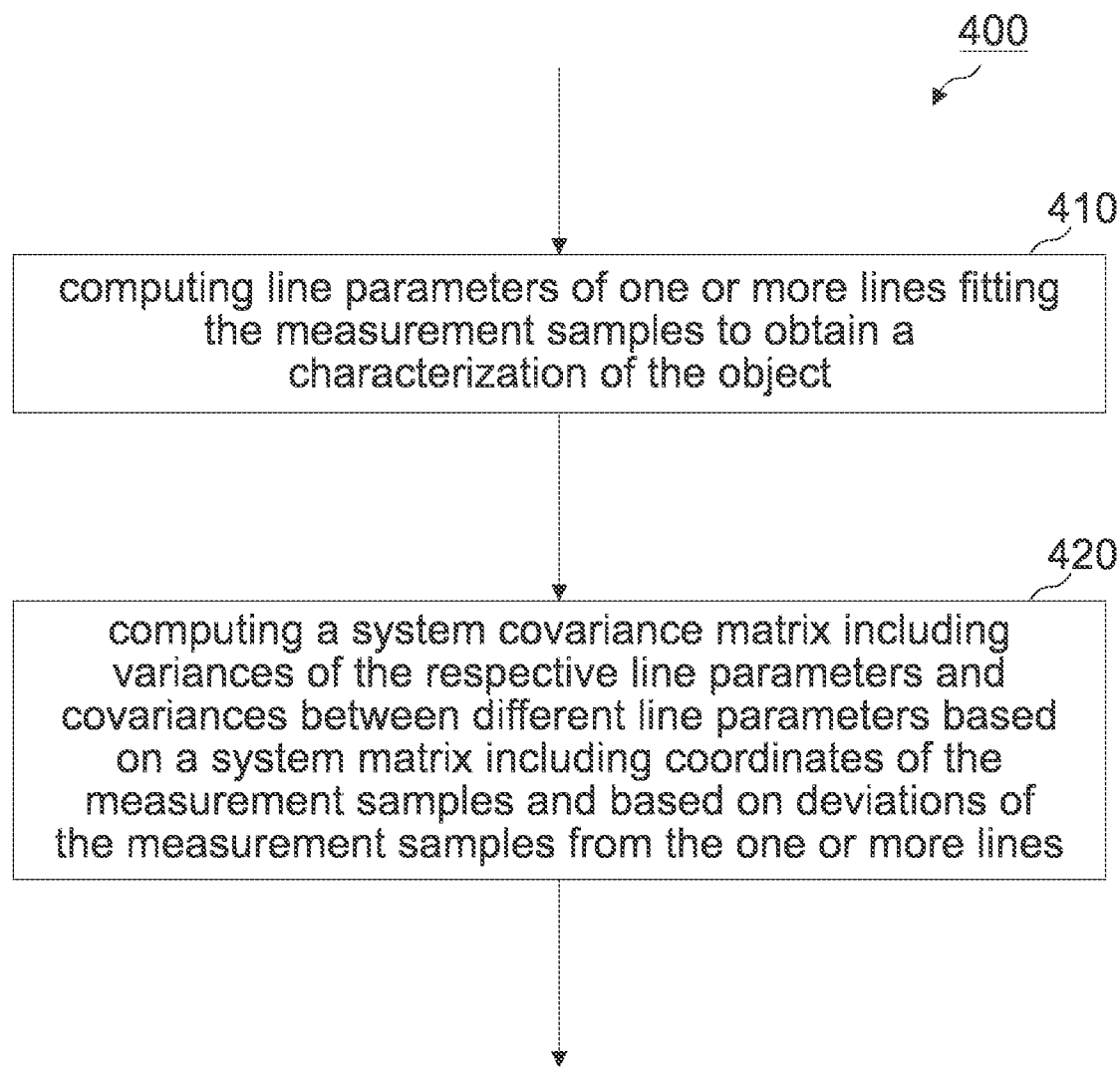
FIG. 4 shows a flowchart of a method of covariance estimation according to an embodiment of the present disclosure.

A high-level flowchart 400 of such a method for characterizing an object 130 based on measurement samples from one or more location sensors 122 is shown in FIG. 4. The skilled person having benefit from the present disclosure will appreciate that method 400 can be implemented by an appropriately configured apparatus 120 of FIG. 1.

Method 400 includes computing 410 line parameters (e.g., $p = [n_1, n_2, c_1, c_2]^T$) of one or more lines 23, 24 fitting the measurement samples 21, 22 to obtain a characterization (e.g., position, orientation) of the object 130. Further, method 400 includes computing 420 a system covariance matrix $\Sigma_{sys}$ including variances of the respective line parameters and covariances between different line parameters based on the system matrix A including coordinates of the measurement samples 21, 22 and based on deviations r of the measurement samples 21, 22 from the one or more lines 23, 24.

For the example scenario of FIG. 2, the system covariance matrix $\Sigma_{sys}$ can be computed according to:

$$\sum\nolimits_{sys} = \frac{r^T r}{N+M-4}(A^T A)^{-1}, \qquad (4)$$

wherein (N+M−4) denotes the cumulated number of measurement samples 21, 22 of both lines 23, 24 minus the number of degrees of freedom. In this case the degrees of freedom are equal to four due to the four line parameters $[n_1, n_2, c_1, c_2]^T$. The skilled person will appreciate that in the illustrated example with the two orthogonal lines 23, 24 the covariance matrix $\Sigma_{sys}$ is a 4×4 matrix having the respective variances of the four line parameters $n_1$, $n_2$, $c_1$, $C_2$ on its main diagonal and covariances between different line parameters on its minor diagonals.

The variance of a random variable can be regarded as a measure of the variability of the random variable. Likewise, the covariance is a measure of the joint variability of two random variables. The system covariance matrix $\Sigma_{sys}$ can be regarded as a measure of the uncertainty of the of the current measurement of lines 23, 24. In this sense it can be used similar to R in above equation (3) for updating the weight coefficient of a Kalman filter while tracking lines/edges 23, 24, for example.

Optionally, the system covariance matrix $\Sigma_{sys}$ can also be used to determine further variances or covariances of arbitrary points located on the fitted lines 23, 24 according to:

$$\Sigma_a = [p_a]^T \Sigma_{sys}[p_a] \qquad (5)$$

wherein $p_a = [x_a, y_a, 1, 0]^T$ denotes a point on the first line 23 or a point $p_a = [-y_a, x_a, 0, 1]^T$ on the second line 24. Such points can be expressed in form of a four-dimensional vector to solve the linear functions according to:
$0 = n_1 x_a + n_2 y_a + 1 \cdot c_1 = p^T \cdot p_a$ for the first line 23 or $0 = n_2 x_a - n_1 y_a + 1 \cdot c_2 = p^T \cdot p_a$ for the second line 24, orthogonal to the first line and for a vector of line parameters according to: $p = [n_1, n_2, c_1, c_2]^T$.

The covariance $\Sigma_a$ can be regarded as a measure of the uncertainty of the current measurement of point $p_a$. In this sense it can be used similar to R in above equation (3) for updating the weight coefficient of a Kalman filter while tracking measurement point $p_a$, for example.

Further optionally, a covariance matrix $\Sigma_i$ related to the intersection point $(x_i, y_i)$ between lines 23 and 24 can be determined in a similar way. The intersection corresponds to a point $(x_i, y_i)$ located on both lines. Hence point coordinates for both linear equations of the respective lines can be used to compute the covariance matrix according to:

$$\Sigma_i [p_1, p_2]^T \Sigma_{sys} [p_1, p_2] \tag{6}$$

wherein $p_1$ and $p_2$ can be expressed as $p_1 = [x_i, y_i, 1, 0]^T$ for the first line 23 and $p_2 = [-y_i, x_i, 1, 0]^T$ for the second line 24. The skilled person will appreciate that in the illustrated example with the two orthogonal lines 23, 24 the covariance matrix $\Sigma_i$ is a 2×2 matrix having the respective variances of x- and y-coordinates its main diagonal and the covariances between them next to it. The mentioned variances and covariances are illustrated graphically in the right chart of FIG. 2 in the form of black ellipses around the intersection point $(x_i, y_i)$. $\Sigma_i$ can be regarded as a measure of the uncertainty of the intersection point $(x_i, y_i)$. In this sense it can be used similar to R in above equation (3) for updating the weight coefficient of a Kalman filter while tracking the intersection point $(x_i, y_i)$, for example.

Figure 5:
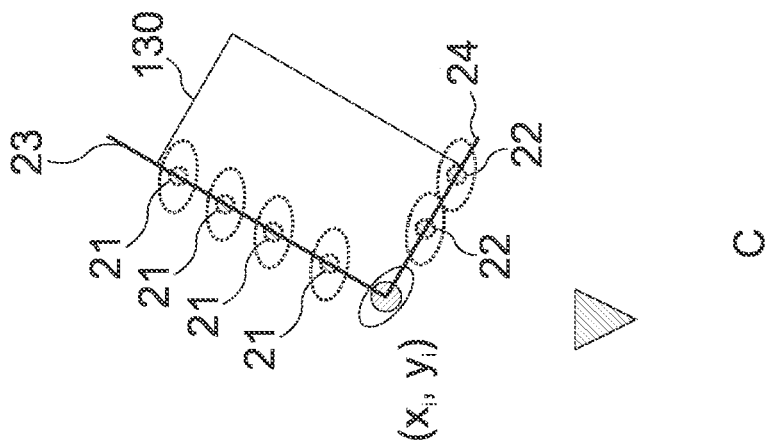
FIG. 5 illustrates an influence of a number of measurement sample on covariance estimation.
Figure 5:
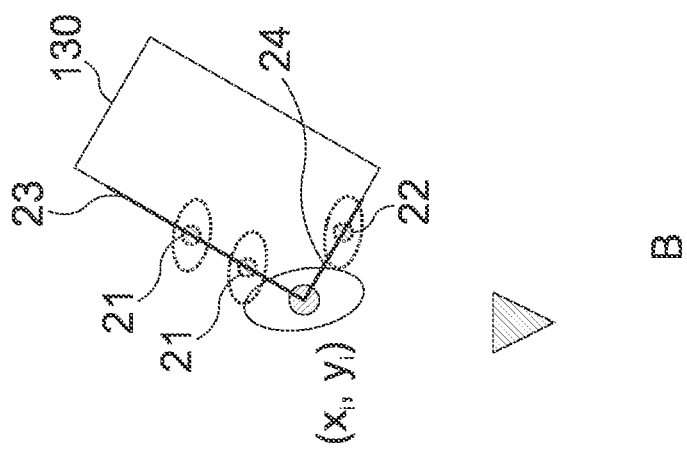
Figure 5:
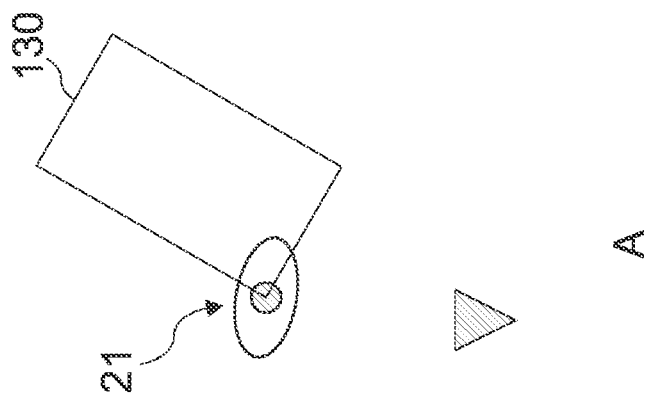

FIG. 5 schematically illustrates different measurement scenarios and their influence on the uncertainty of a resulting reference point used for update in tracking position (dot) and covariance (circle around dot).

Sketch "A" illustrates a scenario with only one measurement sample at a corner of object 130 serving as the reference point for tracking. Here, no computation according to equations (4) and (6) is possible. The reference point has the same uncertainty/covariance as the sensor(s) ($R_{pos} = \Sigma_{sensor}$). Further, the covariance is without correlation between x- and y-position.

Sketch "B" illustrates a scenario with a relatively small number of measurement samples 21, 22 not close to the corner, but enough for setting up linear equation system (1), estimating lines 23, 24, estimating the system covariance matrix $\Sigma_{sys}$ according to equation (4), estimating intersection point $(x_i, y_i)$ as reference point for tracking, and estimating the covariance matrix $\Sigma_i$ according to equation (6). The small number of measurement samples 21, 22 not too close to the corner can lead to a rather high uncertainty of the current measurement of reference point $(x_i, y_i)$ ($R_{pos} = \Sigma_i > \Sigma_{sensor}$). The covariance is relatively large with correlation between x- and y-position.

Sketch "C" illustrates a scenario with a higher number of measurement samples 21, 22 closer to the corner, leading to a lower uncertainty of the current measurement of reference point $(x_i, y_i)$ compared to sketch "B". The resulting covariance is relatively small with correlation between x- and y-position ($R_{pos} = \Sigma_i < \Sigma_{sensor}$).

Figure 6:
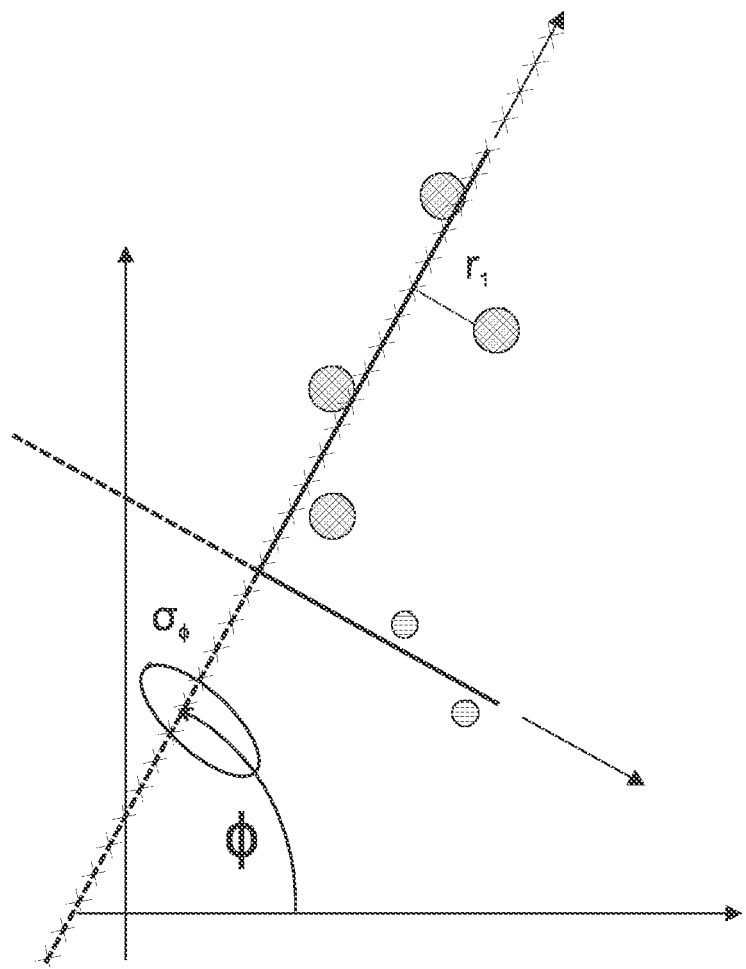
FIG. 6 illustrates a plot of fitted lines with the corresponding orientation and the variance of the orientation.

According to some example embodiments, the object 130 can additionally or alternatively be characterized by its (angular) orientation $\phi$, which is schematically illustrated in FIG. 6. As can bee seen, the object's orientation $\phi$ can be measured using the line parameters $[n_1, n_2, c_1, c_2]^T$ of the fitted lines 23, 24 according to:

$$\Phi = \operatorname{atan}\left(\frac{n_1}{n_2}\right)$$

Using the variances and covariances contained in the system covariance matrix $\Sigma_{sys}$, it is possible to compute the variance $\sigma_\Phi^2$ of the orientation $\phi$ based on a combination of the line parameters $n_1$, $n_2$, variances of said line parameters $n_1$, $n_2$, and covariances of said line parameters. In a particular embodiment related to estimating two orthogonal lines 23, 24, the variance of the orientation $\phi$ can be computed according to $$\sigma_\Phi^2 = \frac{\sigma_{n1}^2 n_2^2 + \sigma_{n2}^2 n_1^2 + 2\mathrm{cov}(n_1, n_2) n_1 n_2}{n_1^2 + n_2^2} \tag{7}$$

wherein $\sigma_{n1}^2$ and $\sigma_{n2}^2$ denote the variances of the respective line parameters $n_1$, $n_2$, and $\mathrm{cov}(n_1, n_2)$ denotes the corresponding covariance. $\sigma_\Phi^2$ can be regarded as a measure of the uncertainty of the current measurement of orientation $\phi$. In this sense it can be used similar to R in above equation (3) for updating the weight coefficient of a Kalman filter while tracking the orientation $\phi$, for example.

Figure 7:
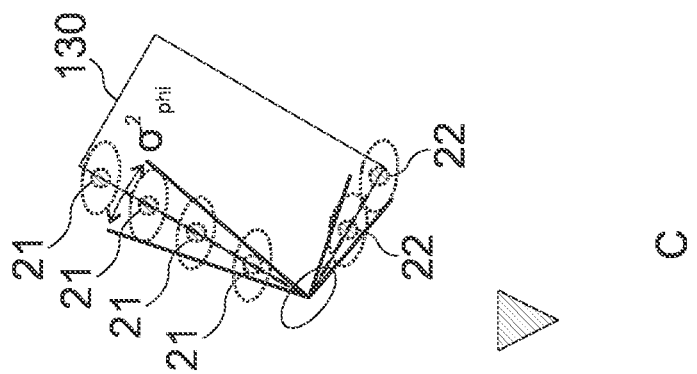
FIG. 7 illustrates an influence of a number of measurement sample on orientation covariance estimation.
Figure 7:
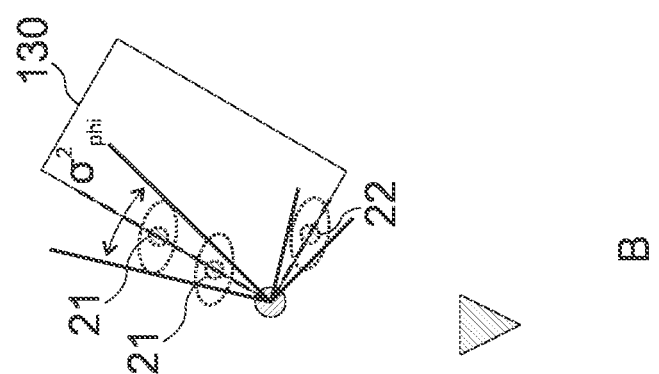
Figure 7:
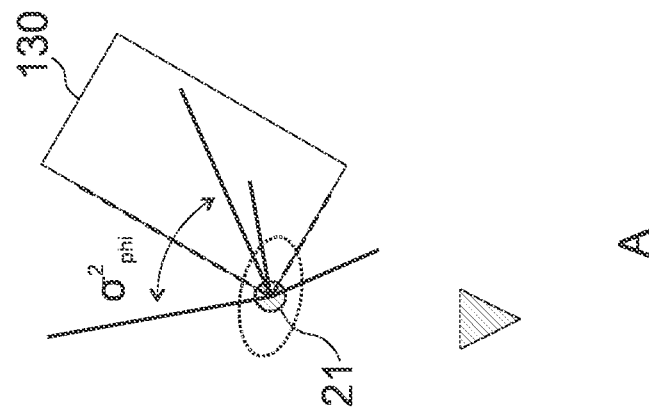

FIG. 7 schematically illustrates different measurement scenarios and their influence on the uncertainty of the orientation $\phi$.

Sketch "A" illustrates a scenario with only one measurement sample 21 at a corner of object 130. Here, no computation according to equations (4) and (7) is possible. Since the single measurement does not yield any information about the object's orientation, $\sigma_{\Phi,A}^2$ can be assumed infinite.

Sketch "B" illustrates a scenario with a small number of measurement samples 21, 22, enough for setting up linear equation system (1), estimating lines 23, 24, estimating the system covariance matrix $\Sigma_{sys}$ according to equation (4), and estimating $\sigma_{\Phi,B}^2$ according to equation (7). The small number of measurement samples 21, 22 will lead to a lower uncertainty of the current measurement of $\phi$ compared to sketch "A", however.

Sketch "C" illustrates a scenario with a higher number of measurement samples 21, 22 leading to a lower uncertainty of the current measurement $\phi$ compared to sketch "B", i.e. $\sigma_{\Phi,B}^2 > \sigma_{\Phi,C}^2$.

The above calculations of the various variances and/or covariances may further be useful to estimate the quality of the fitting process. Large variances and/or covariances may indicate an inaccurate characterization of an object and vice versa. Thus, for example, for automotive implementations the variances and/or covariances can be used to ensure the safety of autonomous driving. For example, an autonomously driving car may decelerate earlier in order to maintain a safety distance with regard to an inaccurate characterization of another car driving in front of the autonomously driving car. Further, as mentioned above, the variances and/or covariances can be used to improve tracking of moving objects by adjusting the coefficient $K_k$ of a Kalman filter. Especially for a characterization of moving objects, such as cars, a tracking filter can be adapted to rapidly changing measurement uncertainties.

Figure 8:
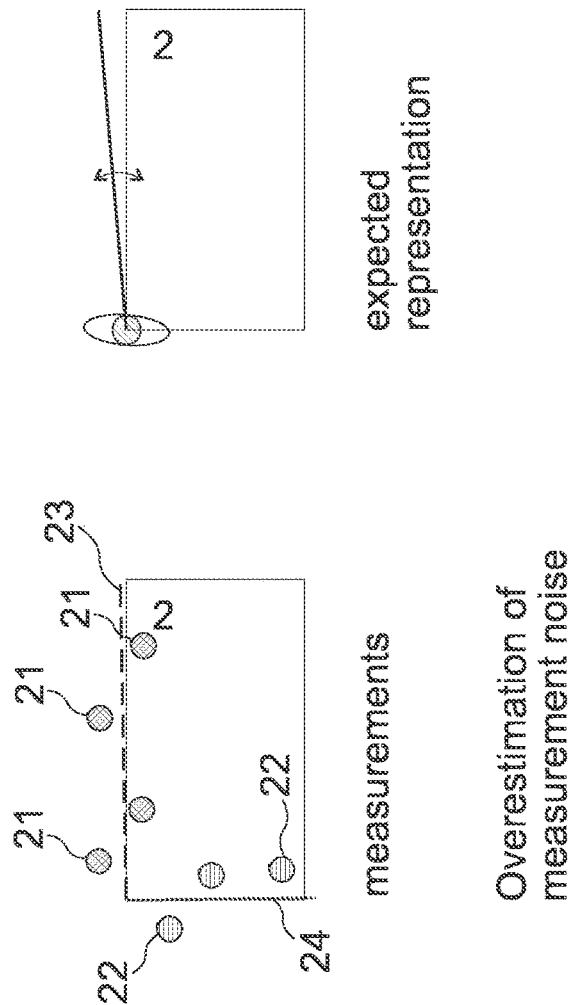
FIG. 8 shows an impact of correct and wrong covariance estimation on tracking.
Figure 2:
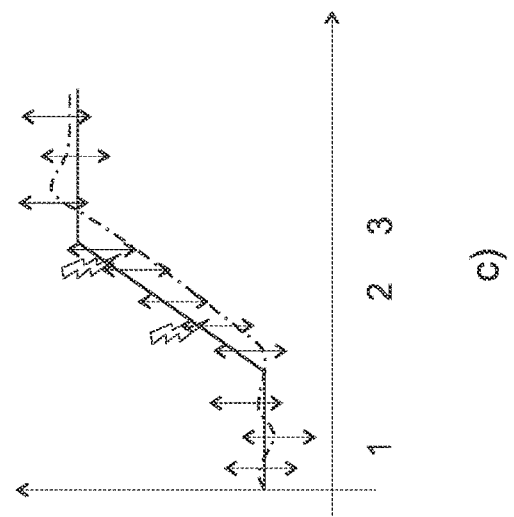

In order to explain possible benefits of the proposed online estimation of the various variances and/or covariances, FIG. 8 illustrates an example traffic situation of a turning object 130, for example a car. The example illustrates a left turn.

Due to the rotation of the object 130, an orientation of the edges of the object 130 changes. Depending on the object's orientation, a different number of measurement points characterizing the edges may be "visible". In a first phase denoted by "1" the object 130 moves towards a location/distance sensor 122 detecting the edges of the object 130. In phase "1", the location sensor 122 only sees the front edge of object 130 and barely sees the side edge(s) of object 130. Thus the line fitting will be rather poor and the uncertainty of the fitting process is large. In a next phase denoted by "2" the object 130 turned a bit more. In phase "2", the location sensor 122 thus "sees" both the front edge and the side edge of object 130. As a result the lines 23, 24 modeling the edges of the object 130 can be fitted more precisely and the uncertainty of the fitting process is lower. In a next phase denoted by "3" the object 130 turned yet a bit more and the location sensor 122 only sees the side edge of object 130 and barely sees the front edge of object 130. Hence the uncertainty of the fitting process increases again.

Chart a) shown in FIG. 8 shows a tracking process with online uncertainty (covariance) estimation in accordance with the different phases 1, 2, and 3. In chart a) the tracked state (e.g. orientation) of the object 130 fits the true state quite well during all phases since measurements with correct covariance estimation are used. Chart "b)" illustrates a tracking process with an underestimated measurement noise in phases 1 and 3 by using a conventional method, such as a look-up-table, for determining the uncertainty. Here, the current measurements $y_k$ are weighted too much compared to the compared to the previously calculated state $\widehat{x_k}^-$. This can lead to a change in the estimate $\widehat{x_k}$ of the current state with low latency, but with high noise. This can be very uncomfortable control due to high noise. Chart "c)" illustrates a tracking process with an overestimated measurement noise in phase 2 by using a conventional method, such as a look-up-table, for determining the uncertainty. Here, the current measurements $y_k$ are weighted too little compared to the previously calculated state $\widehat{x_k}^-$. This can lead to a change in the estimate $\widehat{x_k}$ of the current state with high latency and strong damping. This can lead to slow reactions on critical maneuvers.

Chart "a)" of FIG. 8 shows a desired behavior of a tracking filter which can be provided by embodiments of the present disclosure. While the uncertainty of the fitting process and thus the covariance for phases "1" and "3" is large, the tracking filter characterizes the object predominantly using previously calculated states $\widehat{x_k}^-$, which are more precise than the current measurements $y_k$ of the line fitting process. During the object 130 being in phase "2" the tracking filter "trusts" the measurement measurements $y_k$ more since the uncertainty of the line fitting process and thus the covariance is low.

The mentioned process of chart "a)" in FIG. 8 of tracking an orientation of a turning object can be achieved by an adaptive estimation of a the coefficient $K_k$ adjusting a Kalman filter. A constant estimation of such a coefficient from look-up-tables or heuristics cannot achieve similar results of tracking a turning object, for example. Hence adjusting a discrete time filter by computing the system covariance matrix $\Sigma_{sys}$ as a baseline for further covariances $\Sigma_a$, $\Sigma_i$, or $\sigma_\phi^2$ can provide a more reliable and precise tracking compared to conventional methods based on look-up-tables or heuristics.

Figure 9:
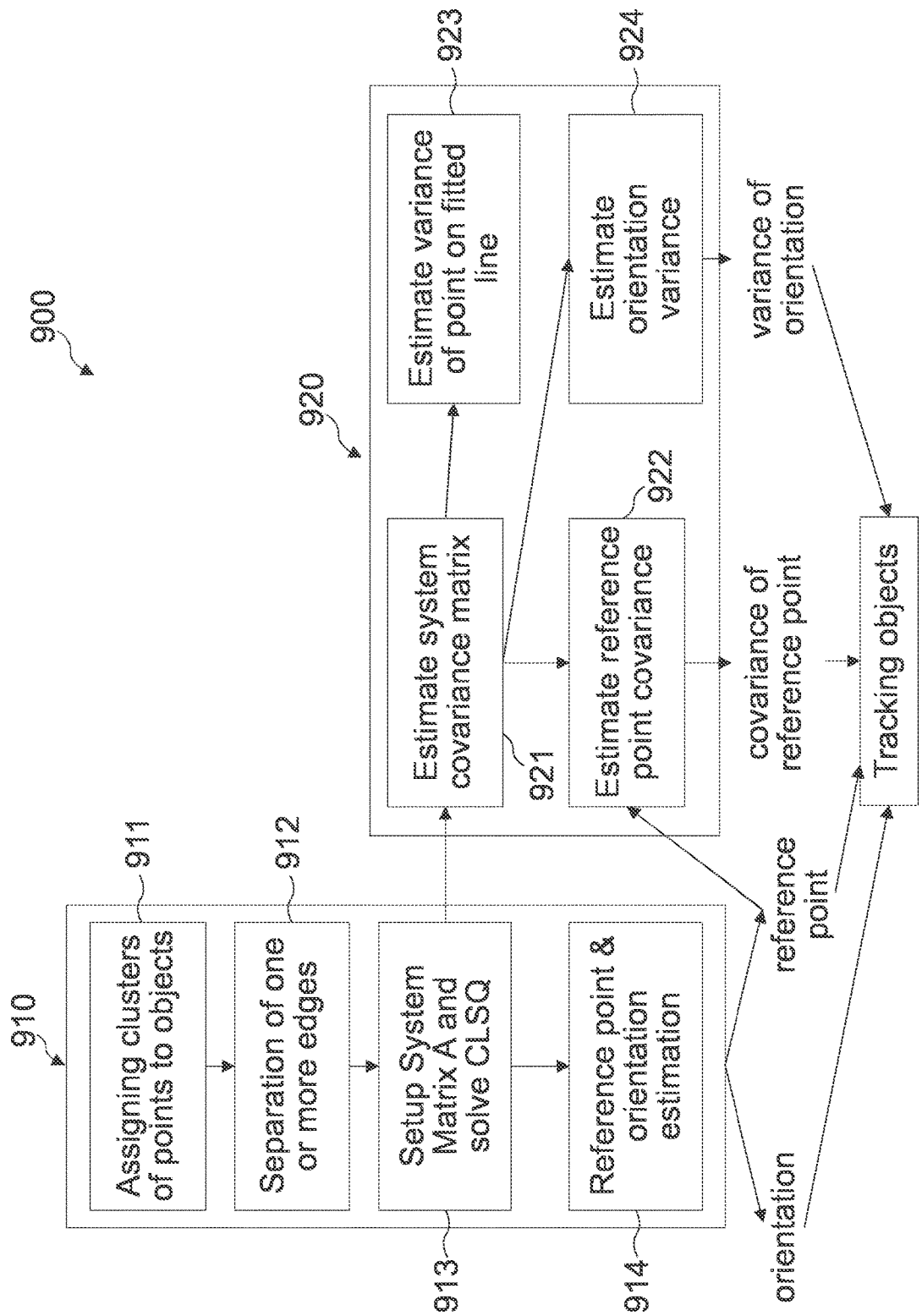
FIG. 9 shows a flowchart summarizing covariance estimation according to an embodiment of the present disclosure.

FIG. 9 provides an overview of the previously described concept of covariance estimation.

In FIG. 9, reference numeral 910 denotes a process of estimating one or more characteristics (e.g., position, orientation, etc.) of the one or more surrounding objects 130 based on measurement samples from the one or more location sensors 122. At 911, clusters of measurement samples can be assigned to different objects 130 using known algorithms, such as density based clustering (DB-SCAN) or K-Means. At 912, measurement samples of a cluster can be assigned to different edges of the corresponding object. This can be done by using known algorithms, such as principal component analysis (PCA) or random sample consensus (RANSAC) algorithm. At 913, the object 130 can be characterized by fitting lines to the measurement samples of the respective edges. The fitting process 913 can be for example a (constraint) least square fit setting up the system matrix A from the measurement samples and solving the linear equation system (1) based on the system matrix A and the vector p including the line parameters $[n_1, n_2, c_1, c_2]^T$. The eigenvector corresponding to the lowest eigenvalue of system matrix A corresponds to the vector of line parameters. At 914, an orientation $\phi$ of the lines 23, 24 and an intersection point $(x_i, y_i)$ (reference point) of the two lines 23, 24 can be determined.

Embodiments of the present disclosure propose to additionally determine the respective covariance $\sigma_\phi^2$, $\Sigma_i$ as respective uncertainty of the measurements $\phi$, $(x_i, y_i)$. This additional process is denoted by reference numeral 920 in FIG. 9. At 921, the system covariance matrix $\Sigma_{sys}$ is estimated, serving as a baseline for computing $\sigma_\phi^2$ at 924 and for computing $\Sigma_i$ at 922. Optionally, the covariance $\Sigma_a$ of arbitrary point $(x_a, y_a)$ can also be computed at 923.

At 930, the measured orientation $\phi$ of the object together with its related covariance $\sigma_\phi^2$ and the measured reference point $(x_i, y_i)$ together with its related covariance $\Sigma_i$ can be used for tracking the respective object 130.

With increasing accuracy or spatial resolution of location/distance sensors, future location/distance sensors (such as laser scanners) are likely to output an enormous number of detections/measurement samples. This can prohibitively increase the computational complexity for estimating object characteristics based on the (constraint) least square fit according to equation (1) since the dimensions of the system matrix A including the measurement samples increase enormously. Thus a processing time may correlate to the number of detections/measurement samples. According to another aspect of the present disclosure, which can also be combined with aforementioned aspects, it is proposed reduce the computational complexity for estimating object characteristics based on the (constraint) least square fit by registering the measurement samples in a grid map with discrete cell size. It can be shown, if the cell size is not significant larger than the sensor measurement uncertainty, an equal performance can be reached compared to directly using all detections.

Figure 10:
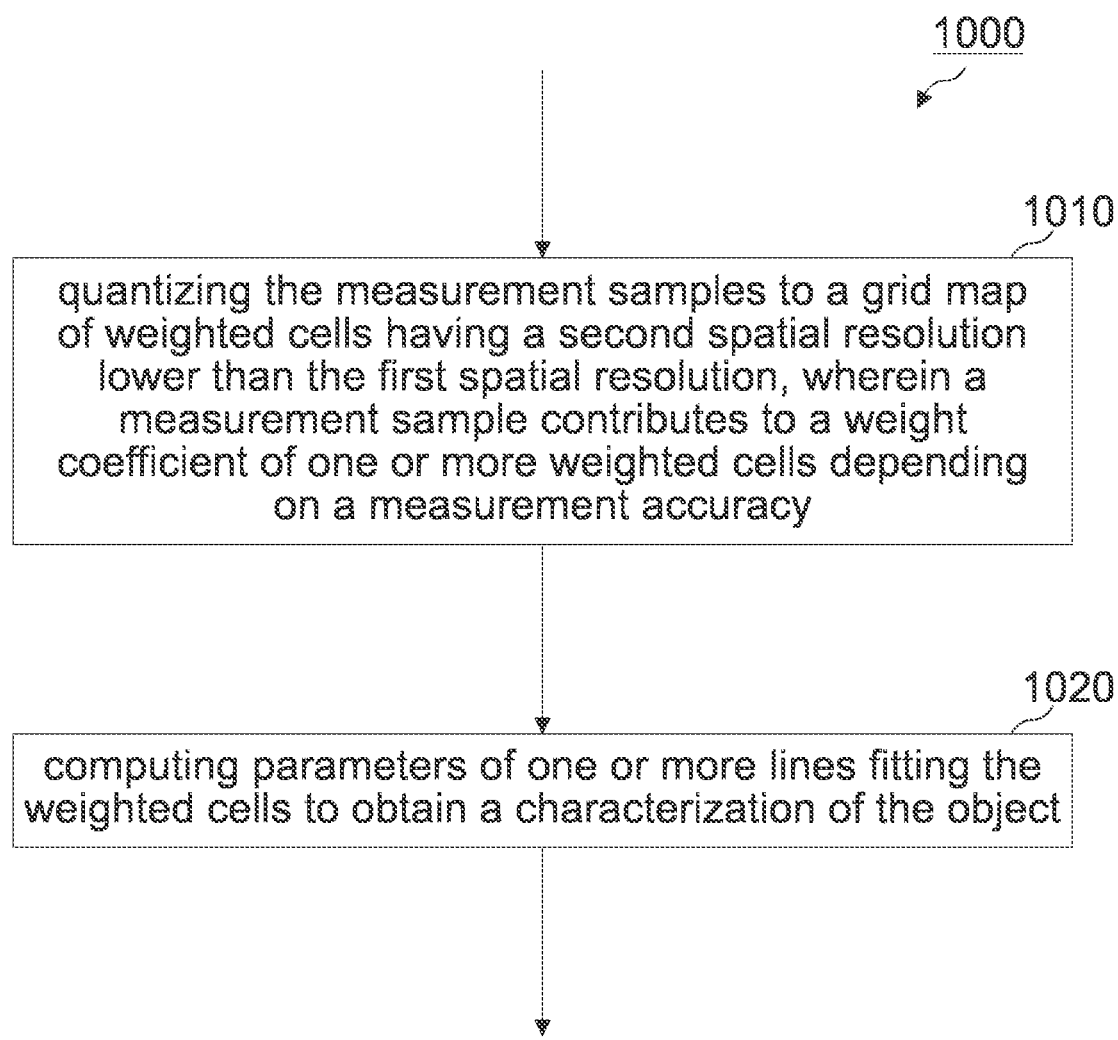
FIG. 10 shows a flowchart of a method of line fitting based on grid maps, according to an embodiment of the present disclosure.

For this purpose embodiments provide a method for characterizing an object based on measurement samples from one or more location sensors. A schematic flowchart of the method 1000 is shown in FIG. 10.

The measurement samples have a first spatial resolution, e.g. corresponding to a spatial resolution of the one or more location/distance sensors. Method 1000 includes quantizing 1010 the measurement samples to a grid map of weighted cells having a second spatial resolution, which is lower than the first spatial resolution. A measurement sample contributes to a weight coefficient of one or more weighted cells depending on a measurement accuracy of the respective measurement sample. Method 1000 further includes computing 1020 parameters of one or more lines 23, 24 fitting the weighted cells to obtain a characterization of the object 130. That is, the measurement samples with high resolution are mapped to cells of the grid map with a lower resolution. In this way, the dimensions of the system matrix system matrix A can be reduced from a high number of measurement samples to a lower number of cells.

The skilled person having benefit from the present disclosure will appreciate that method 1000 can be implemented by an appropriately configured apparatus 120 of FIG. 1.

Figure 11:
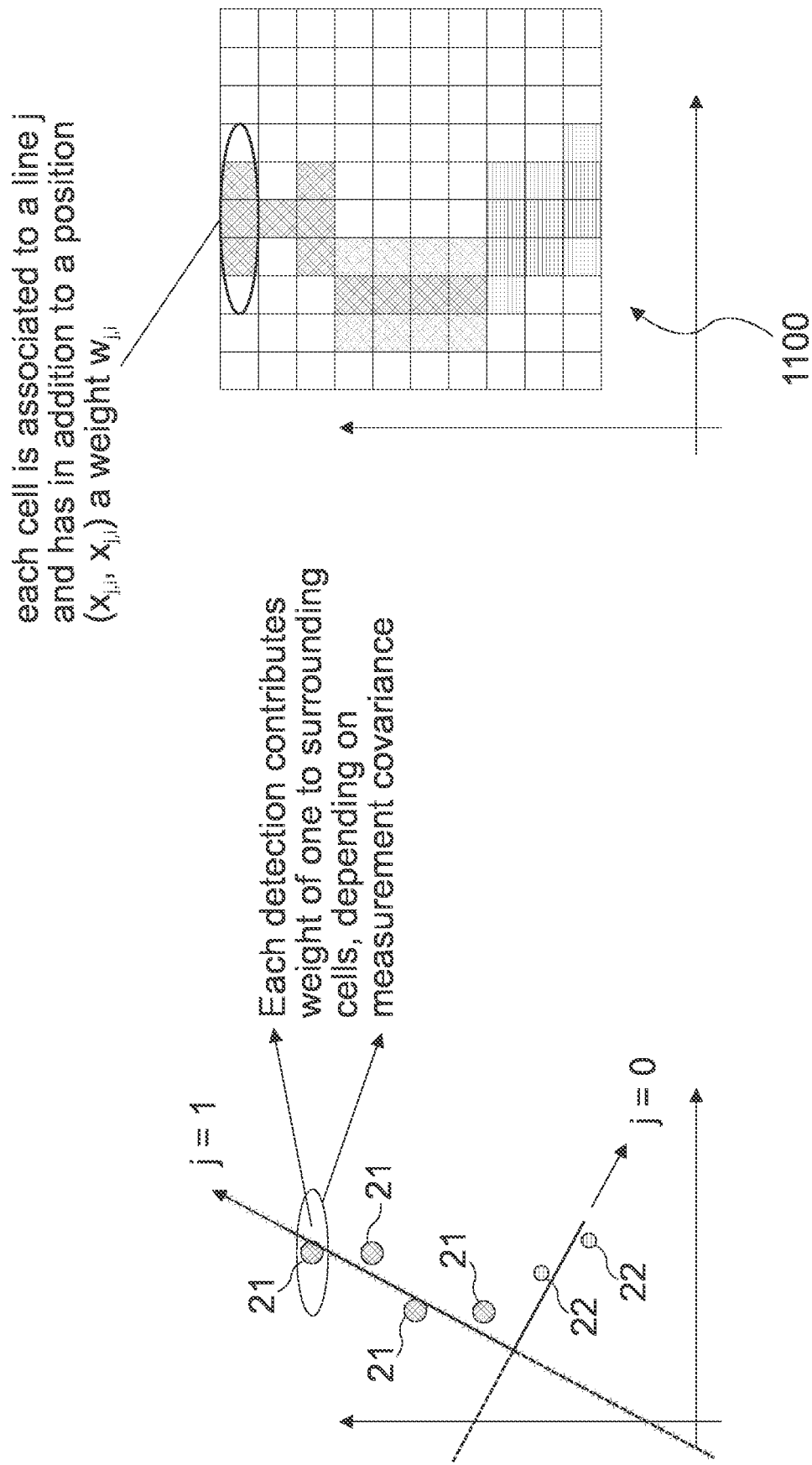
FIG. 11 illustrates mapping measurement samples to a grid map.

As one can see in FIG. 11 in order to quantize the measurement samples 21, 22, they are registered in the grid map 1100 of cells with a spatial resolution which is lower than the spatial resolution of the measurement samples 21, 22. Each cell of the grid map 1100 can be characterized by its coordinates (e.g., corresponding to the cell center), while a characterization of the cell is not limited to Cartesian coordinates, but may also work by using different coordinate systems (e.g. polar coordinates). Further each cell can be characterized by a weight coefficient. Each measurement sample 21, 22 contributes weight to the cell its falls within. Further it can also contribute weight to surrounding cells, depending on the measurement uncertainty (measurement covariance). The weights can be calculated using a predefined probability density function, optionally with normalization. The cell weight is equal to the probability that the detection/measurement is in this cell. For the ease of understanding, this is explained in FIG. 12 for an exemplary 1D case.

Figure 12:
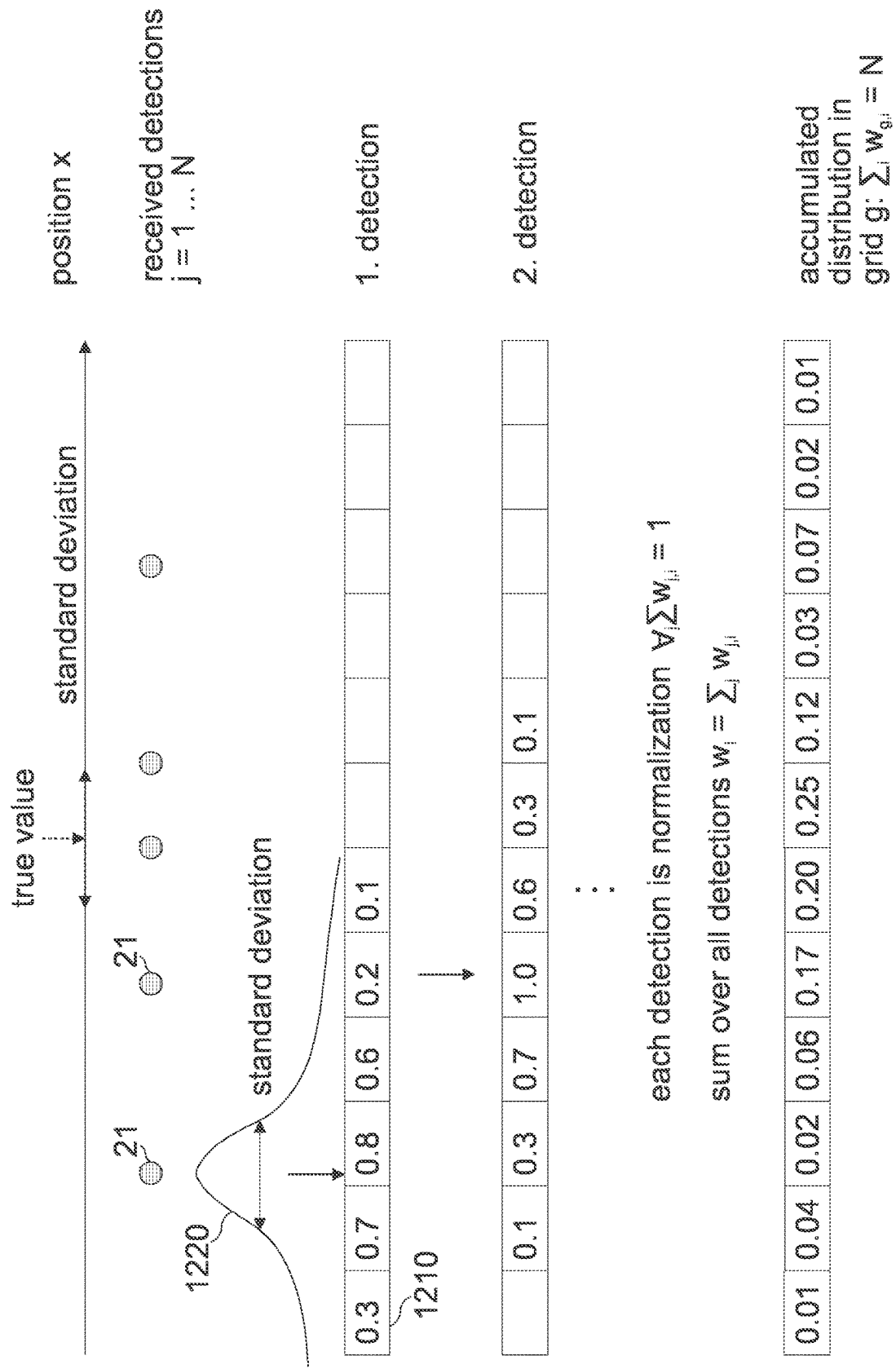
FIG. 12 illustrates how a measurement sample adds weight to a cell.

FIG. 12 illustrates a series of measurement samples 21. The weight coefficient of a weighted cell 1210 is determined based on a probability distribution 1220 around the measurement sample. The probability distribution 1220 can be based on the measurement accuracy of the one or more location sensors 122, for example. In the illustrated example the probability distribution 1220 corresponds to a Gaussian probability distribution having a predefined standard deviation depending on the measurement accuracy. As can be seen, a measurement sample having an associated non-vanishing probability distribution in an area of a weighted cell 1210 adds to the weight coefficient of said cell. If j measurement samples contribute to the weight $w_i$ of cell i, the weight coefficient of cell i can be determined according to $w_i = \Sigma_j w_{j,i}$.

One all measurement samples 21, 22 have been mapped to weighted cells, the weighted cells can be treated as a lower resolution version of the measurement samples and be used as a baseline for a least squares fit similar to equation (1). That is to say, one ore more lines are fitted to the positions of weighted cells instead of the original measurement samples. This means that act 1020 can comprise detecting, based on the weighted cells, one or more edges of the object 130, the one or more edges corresponding to the one or more lines 23, 24.

The cells have a varying weights since more or less detections are in close proximity. These weights have to be taken into account when fitting the shape. In some example implementations, the line parameters of the lines 23, 24 can be computed based on a weighted constraint least square algorithm taking into account the weight coefficients of the one or more weighted cells. The corresponding linear equation system can be $$Wr = W Ap. \tag{8}$$

The linear equation system (8) is based on a system matrix A including the coordinates of the centers of the weighted cells. In the illustrated example the coordinates are Cartesian coordinates in the form (x, y), while regarding further possible examples, the coordinates may relate to different coordinate systems (e.g. polar coordinates). The vector r denotes deviations (distances) of the weighted cells from the (fitted) lines. Again, the line parameters defining the lines are included in vector p. W denotes a matrix of the respective cell weights according to:

$$W = \begin{bmatrix} W_0 & 0 \\ 0 & W_1 \end{bmatrix}$$

$$W_j = \begin{bmatrix} w_{j,i=1} & 0 & 0 \\ 0 & \ddots & 0 \\ 0 & 0 & w_{j,i=N_j} \end{bmatrix}$$

$w_{j,i}$ denotes the weight coefficient of the i-th weighted cell of line j.

A first and a second line parameter $n_1$, $n_2$ defining an orientation of the one or more lines can be determined based on a computation of an eigenvector of a normalized system matrix, wherein the normalized system matrix comprises normalized coordinates of the weighted cells, wherein the normalized coordinates are normalized to mean coordinates of the one or more lines. Expressed mathematically, the first and a second line parameter $n_1$, $n_2$ can be computed according to $[n_1, n_2]^T$ =eigenvector of $(A_{norm}{}^T W A_{norm})$ (with regard to the lower eigenvalue of A)

wherein $A_{norm}$ can be calculated according to:

$$A_{norm} = A - I \begin{bmatrix} \tilde{x}_1 & \tilde{y}_1 \\ \tilde{x}_2 & \tilde{y}_2 \end{bmatrix}$$

with $$I = \begin{bmatrix} 1 & 0 \\ \vdots & \vdots \\ 1 & 0 \\ 0 & 1 \\ \vdots & \vdots \\ 0 & 1 \end{bmatrix}$$

and $\tilde{x}_j = \Sigma_i w_{j,i} x_{j,i}$ and $\tilde{y}_j = \Sigma_i w_{j,i} y_{j,i}$, $x_{j,i}$ and $y_{j,i}$ denoting the coordinates of the center of the i-th weighted cell of line j.

Further, a line parameter defining the position of line j can be determined according to:

$$c_j = \frac{W_j A_j}{\sum w_{j,i}} [n_1 n_2]_T$$

For the example scenario of FIG. 11 (two orthogonal lines), the system covariance matrix $\Sigma_{sys}$ can be computed according to:

$$\Sigma_{Sys} = \frac{r W r^T}{2 \sum w_{j,i}} (A^T W A)^{-1}, \tag{12}$$

The skilled person will appreciate that in the illustrated example with the two orthogonal lines 23, 24 the covariance matrix $\Sigma_{sys}$ is a 4×4 matrix having the respective variances of the four line parameters $n_1$, $n_2$, $c_1$, $c_2$ on its main diagonal and covariances between different line parameters on its minor diagonals. The variance of a random variable can be regarded as a measure of the variability of the random variable. Likewise, the covariance is a measure of the joint variability of two random variables. The system covariance matrix $\Sigma_{sys}$ can be regarded as a measure of the uncertainty of the of the current measurement of lines 23, 24. In this sense it can be used similar to R in above equation (3) for updating the weight coefficient of a Kalman filter while tracking lines/edges 23, 24, for example.

Based on the system covariance matrix $\Sigma_{sys}$, the variance of an orientation, the variance of any point on one of the fitted lines or a covariance matrix of the intersection point can be computed similar to the above calculations. Such uncertainties can then again be used to adapt a tracking filter for a precise tracking result as mentioned before. However while the spatial resolution of the weighted grid map is lower than the spatial resolution of the one or more location sensors, the uncertainty of the fitting process should be equal to a fitting process based on fitting lines directly to the measurement samples.

Figure 13:
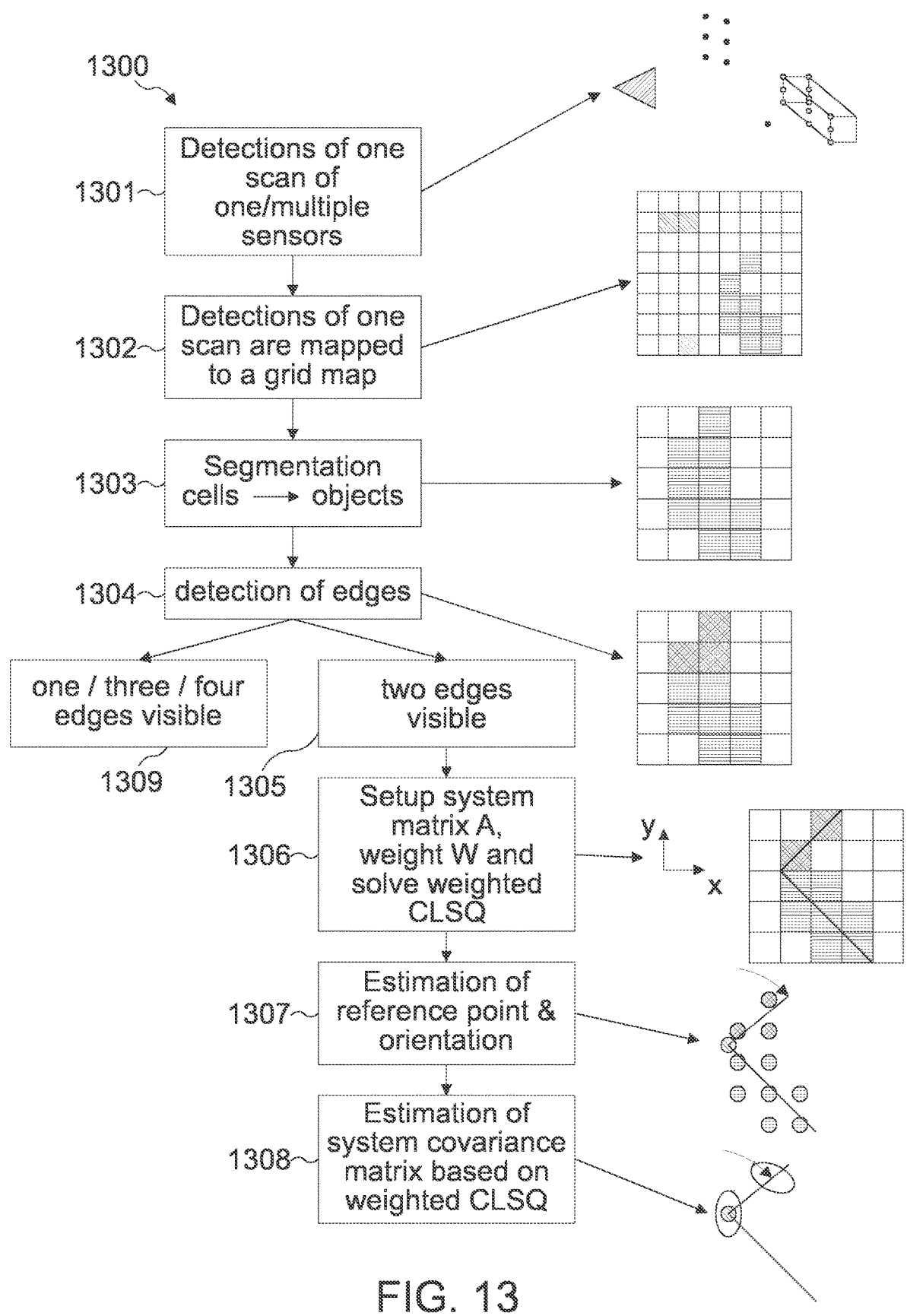
FIG. 13 shows a flowchart summarizing line fitting based on grid maps according to an embodiment of the present disclosure.

FIG. 13 provides an overview of the previously described concept of using grid maps.

At 1301 measurement samples of one scan from one or more sensors are received. At 1302, the measurement samples are mapped to grid map as described before. At 1303, clusters of cells can be assigned to different objects 130 using known algorithms, such as density based clustering (DBSCAN) or K-Means. At 1304, cells of a cluster can be assigned to different edges of the corresponding object. This can be done by using known algorithms, such as principal component analysis (PCA) or random sample consensus (RANSAC) algorithm. At 1306, the object 130 can be characterized by fitting two lines to the weighted cells of the respective edges. The fitting process 1306 can be, for example, a weighted constraint least square fit setting up the system matrix A from the weighted cells and solving the linear equation system (8). The eigenvector corresponding to the lowest eigenvalue of $(A_{norm}^T W A_{norm})$ corresponds to the vector of line parameters $[n_1, n_2]^T$. At 1307, an orientation $\phi$ of the lines 23, 24 and an intersection point $(x_i, y_i)$ (reference point) of the two lines 23, 24 can be determined. At 1308, the system covariance matrix $\Sigma_{sys}$ can be determined according to equation (12). Embodiments of the present disclosure propose to additionally determine the respective covariance $\sigma_\phi^2$, $\Sigma_i$ as respective uncertainty of the measurements $\phi$ and $(x_i, y_i)$. The measured orientation $\phi$ of the object together with its related covariance $\sigma_\phi^2$ and the measured reference point $(x_i, y_i)$ together with its related covariance $\Sigma_i$ can be used for tracking the respective object 130.

Note that the proposed concept is not limited to L-Shapes, but also I-Shape (Line), U-Shape (open rectangle) or Rectangle can be fitted. This is straight-forward since the linear equation system is equivalent, only A and p matrix is varied. The sensors are not limited to laser scanners, but could be as well high resolution radar, camera detections, ultra sonic etc. or a mixture of multiple sensors registered in the same measurement grid.

As an approximation instead of a measurement grid a standard occupancy grid map can be used, which is typically calculated using sensor models. The probability density function does not need to be evaluated for each measurement sample/cell combination, but can be based on a look-up-table (patch) increasing close-by cell weights.

In theory each measurement sample influences an infinite number of cells, since a normal or Laplace distribution is not bounded. Practically after some standard deviations the values are really low. Practically e.g. only the likelihood of cells in 1σ-2σ range may be changed for each detection. Since e.g. the laser scanner has for a detection in a certain distance always the same measurement uncertainty, the increasing value can be calculated before and stored in a look-up-table.

If sensor detections does not always emerge from the edge of a vehicle or outliers are present (close-by-detections not from the object), the approach can be extended by a RANSAC algorithm to exclude these cells from fitting.

From the linear equations of the fitted lines including the determined line parameters one can compute an intersection point 1107. Defining and/or tracking the position and/or motion of an intersection point can be useful to estimate a position, velocity or rotation of a detected object. Instead of using, for example a measurement point, to determine a position or velocity of an object, using the intersection point of two fitted lines as a reference point should be more reasonable. While measurement points are not fixed to a specified point on the object's surface, the intersection point defines approximately the corner of an object. Thus the intersection point is also called reference point. In some example of a vehicle of the present disclosure it may be useful to determine such a reference point, for example to compute a maneuver to pass another car on a highway. However this may also be useful to initiate emergency braking in case of an emergency situation.

Further the present disclosure comprises determining an orientation of an object. The said orientation can directly be calculated from the first line parameters $n_1$ and $n_2$ for a present example of fitting two orthogonal lines according to:

$$\Phi = \operatorname{atan}\left(\frac{n_1}{n_2}\right)$$

However for further implementations of the present disclosure an orientation may also be defined for one or more lines, which can also be non-orthogonal.

As mentioned above, for tracking purposes an estimation of the uncertainty of the fitting process can be useful, for example to adapt a Kalman filter. However this is also possible using a grid map of weighted cells and the corresponding fitted lines. Similar to a fitting process without using grid maps, calculating uncertainties of a fitting process can be based on a system covariance matrix including covariances and variances of the line parameters 1108. Additionally to a vector of deviations r and a system matrix A, one may also provide the matrix W including the cumulated cell weights $w_{j,i}$ to calculate a system covariance matrix according to:

$$\Sigma_{Sys} = \frac{rWr^T}{2\sum w_{j,i}}(A^T W A)^{-1}$$

wherein r denotes a vector including the deviations of cell coordinates of weighted cells to the fitted lines and A denotes a system matrix of cell coordinates as mentioned before.

Based on the calculated system covariance matrix, the variance of an orientation, the variance of any point on one of the fitted lines or a covariance matrix of the intersection point can be computed similar to the above calculations. Such uncertainties can then again be used to adapt a tracking filter for a precise tracking result as mentioned before.

However while the spatial resolution of the weighted grid map is lower than the spatial resolution of the one or more location sensors, the uncertainty of the fitting process should be equal to a fitting process based on fitting lines directly to the measurement samples.

Due to the similar uncertainty of the fitting process and a reduced effort of fitting lines to quantized measurement samples, the method of the present disclosure provides an efficient characterization of surrounding objects. Thus the quantization of measurement samples of location sensors with high resolution can be used for tracking purposes. Further for tracking objects tracking filter, such as a Kalman filter, can be used. Then again a tracking filter can be adapted by using a system covariance matrix calculated simultaneously from the weighted grid map.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An apparatus for characterizing an object based on measurement samples from one or more location sensors, the measurement samples having a first spatial resolution, the apparatus comprising:
   a processor circuit configured to
      quantize the measurement samples to a grid map of weighted cells having a second spatial resolution lower than the first spatial resolution, wherein a measurement sample contributes to a weight coefficient of one or more weighted cells depending on a measurement accuracy;
      and compute line parameters of one or more lines fitting the weighted cells to obtain a characterization of the object.

2. The apparatus of claim 1, wherein the processor circuit is configured to determine the weight coefficient of a weighted cell based on a probability distribution around the measurement sample, wherein the probability distribution is based on the measurement accuracy of the one or more location sensors.

3. The apparatus of claim 2, wherein a measurement sample having an associated non-vanishing probability distribution in an area of a weighted cell adds to the weight coefficient of said cell.

4. The apparatus of claim 1, wherein the processor circuit is configured to detect, based on the weighted cells, one or more edges of the object, the one or more edges corresponding to the one or more lines.

5. The apparatus of claim 1, wherein the processor circuit is configured to compute line parameters of two orthogonal lines fitting the weighted cells.

6. The apparatus of claim 1, wherein the processor circuit is configured to compute the line parameters of the one or more lines based on a weighted constraint least square algorithm taking into account the weight coefficients of the one or more weighted cells.

7. The apparatus of claim 6, wherein the processor circuit is configured to compute a first and a second line parameter corresponding to an orientation of the one or more lines based on a computation of an eigenvector of a normalized system matrix, the normalized system matrix comprising normalized coordinates of the weighted cells, the normalized coordinates being normalized to mean coordinates of the one or more lines.

8. The apparatus of claim 7, wherein the processor circuit is configured to compute at least one further line parameter $c_j$ corresponding to a position of line j based on:

$$c_j = \frac{W_j A_j}{\sum w_{j,i}} [n_1 n_2]_T,$$

wherein $n_1$ and $n_2$ correspond to the first and a second line parameter, $$W_j = \begin{pmatrix} w_{j,1} & 0 & 0 \\ 0 & \ddots & 0 \\ 0 & 0 & w_{j,N} \end{pmatrix}$$

with $w_{j,i}$ being the weight of the i-th weighted cell of line j, wherein $A_j$ is the corresponding part of the system matrix A, including the measurement samples of line j.

9. The apparatus of claim 6, wherein the processor circuit is configured to compute a system covariance matrix including variances of the respective line parameters and covariances between different line parameters based on a system matrix including coordinates of the weighted cells, the weight coefficients of the weighted cells, and based on deviations of the weighted cells from the one or more lines.

10. The apparatus of claim 9, wherein the processor circuit is configured to compute the system covariance matrix $\Sigma_{Sys}$ according to:

$$\Sigma_{Sys} = \frac{r^T W r}{2 \sum w_{j,i}} (A^T W A)^{-1}$$

wherein A is a system matrix including coordinates of the measurement samples, r is a vector including the deviations of the weighted cells from the one or more lines, $\Sigma$ is a matrix including variances and covariances of the line parameters and W is a matrix including weight matrices corresponding to the one or more lines according to $$W = \begin{bmatrix} W_{j=1} & 0 & 0 \\ 0 & \ddots & 0 \\ 0 & 0 & W_{j=K} \end{bmatrix},$$

wherein K is the number of lines.

11. The apparatus of claim 9, wherein the processor circuit is configured to compute a covariance matrix of coordinates $(x_c, y_c)$ of an intersection point between a first and a second line based on the system covariance matrix and the coordinates $(x_c, y_c)$.

12. The apparatus of claim 9, wherein the processor circuit is configured to compute a variance of an orientation of the one or more lines based on line parameters corresponding to an orientation of the one or more lines, variances, and covariances thereof.

13. A vehicle comprising one or more location sensors and an apparatus of claim 1.

14. A method for characterizing an object based on measurement samples from one or more location sensors, the measurement samples having a first spatial resolution, the method comprising:
  quantizing the measurement samples to a grid map of weighted cells having a second spatial resolution lower than the first spatial resolution, wherein a measurement sample contributes to a weight coefficient of one or more weighted cells depending on a measurement accuracy; and
  computing parameters of one or more lines fitting the weighted cells to obtain a characterization of the object.

15. A non-transitory computer-readable medium having a program code for performing the method of claim 14, when the program code is executed on a programmable hardware device.

* * * * *